United States Patent
Obama et al.

(10) Patent No.: US 10,126,535 B2
(45) Date of Patent: Nov. 13, 2018

(54) VARIABLE MAGNIFICATION OPTICAL SYSTEM, OPTICAL DEVICE, AND PRODUCTION METHOD FOR VARIABLE MAGNIFICATION OPTICAL SYSTEM

(71) Applicant: NIKON CORPORATION, Tokyo (JP)

(72) Inventors: Akihiko Obama, Tokyo (JP);
Tomoyuki Sashima, Tokyo (JP)

(73) Assignee: Nikon Corporation, Tokyo (JP)

( * ) Notice: Subject to any disclaimer, the term of this patent is extended or adjusted under 35 U.S.C. 154(b) by 274 days.

(21) Appl. No.: 14/700,295

(22) Filed: Apr. 30, 2015

(65) Prior Publication Data
US 2015/0234160 A1    Aug. 20, 2015

Related U.S. Application Data

(63) Continuation of application No. PCT/JP2013/079237, filed on Oct. 29, 2013.

(30) Foreign Application Priority Data

Oct. 30, 2012 (JP) ................. 2012-238726
Oct. 30, 2012 (JP) ................. 2012-238727
Oct. 30, 2012 (JP) ................. 2012-238728

(51) Int. Cl.
*G02B 15/14* (2006.01)
*G02B 9/60* (2006.01)
(Continued)

(52) U.S. Cl.
CPC ............. *G02B 15/14* (2013.01); *G02B 3/02* (2013.01); *G02B 3/04* (2013.01); *G02B 5/005* (2013.01);
(Continued)

(58) Field of Classification Search
CPC .... G02B 13/0045; G02B 15/14; G02B 13/18; G02B 9/60; G02B 3/04; G02B 13/009;
(Continued)

(56) References Cited

U.S. PATENT DOCUMENTS 5,202,992 A    4/1993  Banno et al.
6,191,894 B1   2/2001  Kitamura et al.
(Continued)

FOREIGN PATENT DOCUMENTS

JP    2000-89112 A    3/2000
JP    2001-318315 A   11/2001
(Continued)

OTHER PUBLICATIONS

English Translation of IPRP and Written Opinion of the International Searching Authority from International Patent Application No. PCT/JP2013/079237, dated May 14, 2015.
(Continued)

*Primary Examiner* — Evelyn A Lester
(74) *Attorney, Agent, or Firm* — Shapiro, Gabor and Rosenberger, PLLC

(57) ABSTRACT

Comprising, in order from an object side: a first lens group G1 having positive refractive power; a second lens group G2 having negative refractive power; a third lens group G3 having positive refractive power; a fourth lens group G4 having positive refractive power; and a fifth lens group; upon zooming from a wide-angle end state to a telephoto end state, the distance between the first lens group G1 and the second lens group G2, the distance between the second lens group G2 and the third lens group G3, and the distance between the third lens group G3 and the fourth lens group G4, and the distance between the fourth lens group G4 and the fifth lens group G5 being varied, and the fifth lens group G5 being fixed in a position; and a predetermined condi-
(Continued)

tional expression being satisfied, thereby providing a variable magnification optical system that has a high variable magnification ratio, is compact in size and has high optical performance, an optical apparatus, and a method for manufacturing the variable magnification optical system.

26 Claims, 16 Drawing Sheets

(51) Int. Cl.
| | |
|---|---|
| G02B 13/00 | (2006.01) |
| G02B 23/24 | (2006.01) |
| G02B 13/18 | (2006.01) |
| G02B 13/12 | (2006.01) |
| G02B 5/00 | (2006.01) |
| G02B 3/04 | (2006.01) |
| G02B 3/02 | (2006.01) |

(52) U.S. Cl.
CPC .............. *G02B 9/60* (2013.01); *G02B 13/009* (2013.01); *G02B 13/0045* (2013.01); *G02B 13/12* (2013.01); *G02B 13/18* (2013.01); *G02B 23/2438* (2013.01); *Y10T 29/49826* (2015.01)

(58) Field of Classification Search
CPC .......... G02B 5/005; G02B 13/12; G02B 3/02; G02B 23/2438
USPC ................. 359/676, 683–687, 714, 740, 764
See application file for complete search history.

(56) References Cited

U.S. PATENT DOCUMENTS

| | | | |
|---|---|---|---|
| 7,180,682 B1 | 2/2007 | Terada | |
| 7,286,304 B1 | 10/2007 | Ohtake | |
| 7,489,451 B2 | 2/2009 | Terada et al. | |
| 7,542,212 B2 | 6/2009 | Toyoda et al. | |
| 7,557,852 B2 | 7/2009 | Hashimoto et al. | |
| 7,609,460 B2 | 10/2009 | Suzaki et al. | |
| 7,821,723 B2 | 10/2010 | Toyama | |
| 7,903,344 B2 * | 3/2011 | Take .................... | G02B 15/173 359/676 |
| 2002/0012174 A1 | 1/2002 | Horiuchi | |
| 2006/0140606 A1 | 6/2006 | Terada et al. | |
| 2007/0052834 A1 | 3/2007 | Hashimoto et al. | |
| 2007/0058268 A1 | 3/2007 | Terada | |
| 2007/0263299 A1 | 11/2007 | Ohtake | |
| 2007/0279760 A1 | 12/2007 | Toyoda et al. | |
| 2008/0112061 A1 | 5/2008 | Miyajima | |
| 2009/0128923 A1 | 5/2009 | Toyama | |
| 2009/0168193 A1 | 7/2009 | Suzaki et al. | |
| 2011/0007403 A1 | 1/2011 | Matsuo | |
| 2011/0134266 A1 * | 6/2011 | Mihara ................. | G02B 13/18 359/708 |
| 2011/0228160 A1 * | 9/2011 | Imaoka ................ | G02B 15/173 359/683 |
| 2012/0075494 A1 * | 3/2012 | Katayose ............. | G02B 15/173 359/684 |
| 2012/0147253 A1 | 6/2012 | Anzawa et al. | |
| 2013/0141797 A1 | 6/2013 | Hagiwara | |
| 2013/0148009 A1 | 6/2013 | Miyatani et al. | |
| 2013/0300868 A1 | 11/2013 | Yamamoto | |
| 2014/0118607 A1 | 5/2014 | Takemoto | |

FOREIGN PATENT DOCUMENTS

| | | | |
|---|---|---|---|
| JP | 2006-184413 A | 7/2006 | |
| JP | 2006-189598 A | 7/2006 | |
| JP | 2006-300969 A | 11/2006 | |
| JP | 2007-065525 A | 3/2007 | |
| JP | 2007-068063 A | 3/2007 | |
| JP | 2007-079194 A | 3/2007 | |
| JP | 2007-292994 A | 11/2007 | |
| JP | 2007-322804 A | 12/2007 | |
| JP | 2008-164725 A | 7/2008 | |
| JP | 2009-128491 A | 6/2009 | |
| JP | 2009-128492 A | 6/2009 | |
| JP | 2009-157067 A | 7/2009 | |
| JP | 2009-169264 A | 7/2009 | |
| JP | 2011-017912 A | 1/2011 | |
| JP | 2011-048320 A | 3/2011 | |
| JP | 2012-128116 A | 7/2012 | |
| JP | 2013-037063 A | 2/2013 | |
| JP | 2013-117657 A | 6/2013 | |
| JP | 2013-125075 A | 6/2013 | |
| JP | 2014-085617 A | 5/2014 | |
| WO | WO 2012/102105 A1 | 8/2012 | |

OTHER PUBLICATIONS

International Search Report from International Patent Application No. PCT/JP2013/079237, dated Jan. 21, 2014.
Partial Supplementary European Search Report dated May 19, 2016, in European Patent Application No. EP13851067.2.
Examination Report dated Apr. 13, 2018, in Indian Patent Application No. 3667/DELNP/2015.
English Translation of Office Action dated Mar. 6, 2018, in Japanese Patent Application No. 2012-238727.

* cited by examiner

VARIABLE MAGNIFICATION OPTICAL SYSTEM, OPTICAL DEVICE, AND PRODUCTION METHOD FOR VARIABLE MAGNIFICATION OPTICAL SYSTEM

TECHNICAL FIELD

The present invention relates to a variable magnification optical system, an optical device, and a method for producing the variable magnification optical system.

BACKGROUND ART

There have been proposed many variable magnification optical systems whose most object side lens group has positive refractive power and which are suitable for an interchangeable lens for a photographing camera, an electronic still camera, a video camera or the like, for example, in Japanese Patent application Laid-Open No. 2007-292994.

PRIOR ART DOCUMENT

Patent Document

Patent Document 1: Japanese Patent application Laid-Open Gazette No. 2007-292994

SUMMARY OF THE INVENTION

Problems to be Solved by the Invention

However, in the conventional variable magnification optical systems as described above, there was a problem that, even if it was intended to downsize an apparatus while maintaining high variable magnification ratio, sufficiently high optical performance could not have been realized.

The present invention is made in view of the above-described problem, and has an object to provide a variable magnification optical system that has a high variable magnification ratio, is compact in size and exhibits high optical performance, an optical apparatus, and a method for manufacturing the variable magnification optical system.

Means for Solving the Problem

In order to solve the above-mentioned object, according to a first aspect of the present invention, there is provided a variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and the following conditional expressions being satisfied:

$$0.650<(-f2)/fw<1.180$$

$$0.300<f1/ft<0.555$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group.

Further, according to a second aspect of the present invention, there is provided an optical apparatus equipped with the variable magnification optical system according to the first aspect of the present invention.

Further, according to a third aspect of the present invention, there is provided a variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and the following conditional expressions being satisfied:

$$0.650<(-f2)/fw<1.180$$

$$0.040<(-f2)/ft<0.092$$

where fw denotes a focal length of the variable magnification optical system in the wide-angle end state, ft denotes a focal length of the variable magnification optical system in the telephoto end state, and f2 denotes a focal length of the second lens group.

Further, according to a fourth aspect of the present invention, there is provided an optical apparatus equipped with the variable magnification optical system according to the third aspect of the present invention.

Further, according to a fifth aspect of the present invention, there is provided a variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and the following conditional expressions being satisfied:

$$5.000<f1/fw<7.800$$

$$0.300<f1/ft<0.555$$

where fw denotes a focal length of the variable magnification optical system in the wide-angle end state, ft denotes a focal length of the variable magnification optical system in the telephoto end state, and f1 denotes a focal length of the first lens group.

Further, according to a sixth aspect of the present invention, there is provided an optical apparatus equipped with the variable magnification optical system according to the fifth aspect of the present invention.

Further, according to a seventh aspect of the present invention, there is provided a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising the steps of:

constructing the first lens group and the second lens group to satisfy the following conditional expressions:

$$0.650<(-f2)/fw<1.180$$

$$0.300<f1/ft<0.555$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position.

Further, according to an eighth aspect of the present invention, there is provided a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising the steps of:

constructing the second lens group to satisfy the following conditional expressions:

$$0.650<(-f2)/fw<1.180$$

$$0.040<(-f2)/ft<0.092$$

where fw denotes a focal length of the variable magnification optical system in the wide-angle end state, ft denotes a focal length of the variable magnification optical system in the telephoto end state, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position.

Further, according to a ninth aspect of the present invention, there is provided a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising the steps of:

constructing the first lens group to satisfy the following conditional expressions:

$$5.000<f1/fw<7.800$$

$$0.300<f1/ft<0.555$$

where fw denotes a focal length of the variable magnification optical system in the wide-angle end state, ft denotes a focal length of the variable magnification optical system in the telephoto end state, and f1 denotes a focal length of the first lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position.

Effect of the Invention

According to the present invention, there are provided a variable magnification optical system which has a high variable magnification ratio, is compact in size and has excellent optical performance, an optical apparatus, and a method for manufacturing the variable magnification optical system.

EMBODIMENTS FOR CARRYING OUT THE INVENTION

Figure 1A:
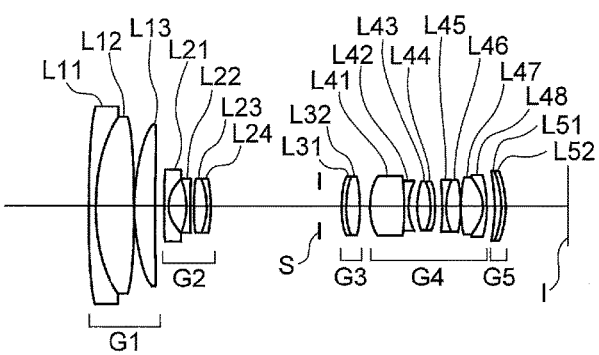
FIGS. 1A, 1B, 1C, 1D and 1E are sectional views showing a variable magnification optical system according to a First Example that is common to a first to a third embodiments of the present application, in a wide-angle end state, in a first intermediate focal length state, in a second intermediate focal length state, in a third intermediate focal length state, and in a telephoto end state, respectively.
Figure 1B:
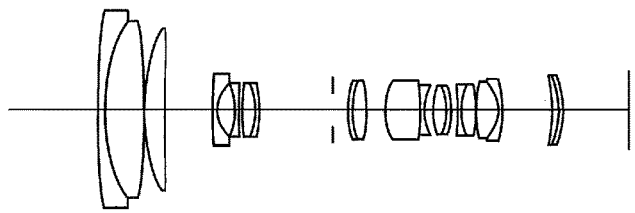
Figure 1C:
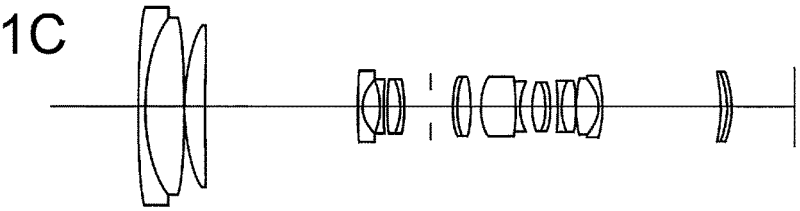
Figure 1D:
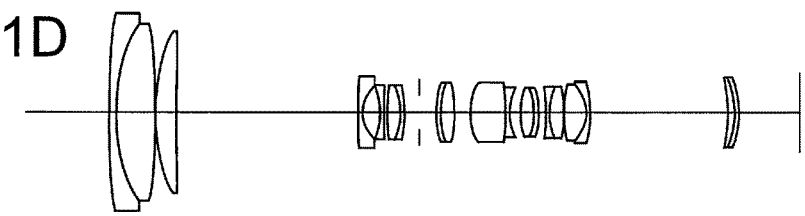
Figure 1E:
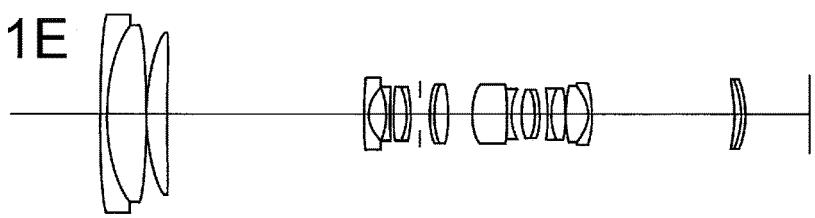

A variable magnification optical system according to the first embodiment of the present application, an optical apparatus and a method for manufacturing the variable magnification optical system are explained below.

The variable magnification optical system according to the first embodiment of the present application is characterized in that the system comprises, in order from an object side: a first lens group having positive refractive power; a second lens group having negative refractive power; a third lens group having positive refractive power; a fourth lens group having positive refractive power, and a fifth lens group; and upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group are varied. With such configuration, the variable magnification optical system according to the first embodiment of the present application can realize the zooming from the wide-angle end state to the telephoto end state and can suppress variation in each of the distortion, astigmatism and spherical aberration in connection with the zooming.

The variable magnification optical system according to the first embodiment of the present application is also characterized in that, upon zooming from the wide angle end state to the telephoto end state, the fifth lens group is fixed for the position. With such construction, it is possible to vary the height of marginal light rays made incident from the fourth lens group to the fifth lens group from the optical axis upon zooming. Owing to this, the variation in the astigmatism can be suppressed more successfully upon zooming.

The variable magnification optical system according to the first embodiment of the present application is also characterized in that the following conditional expressions (1) and (2) are satisfied:

$$0.650 < (-f2)/fw < 1.180 \qquad (1)$$

$$0.300 < f1/ft < 0.555 \qquad (2)$$

where fw denotes a focal length of the variable magnification optical system in the wide angle end state, ft denotes a focal length of the variable magnification optical system in the telephoto end state, f1 denotes a focal length of the first lens group, and f2 denotes a focal length of the second lens group.

The conditional expression (1) defines a proper range of the focal length of the second lens group. The variable magnification optical system according to the first embodiment of the present application can suppress the variation in the spherical aberration and the variation in the astigmatism upon zooming, by satisfying the conditional expression (1).

When the value of (−f2)/fw is equal to or falls below the lower limit of the conditional expression (1) for the variable magnification optical system according to the first embodiment of the present application, it becomes difficult to suppress the variation in the spherical aberration and the variation in the astigmatism occurring in the second lens group upon zooming, with the result that high optical performance cannot be realized. Meanwhile, in order to attain the advantageous effect of the present application more surely, it is more preferable to set the lower limit value of the conditional expression (1) to 0.760.

On the other hand, when the value of (−f2)/fw is equal to or exceeds the upper limit of the conditional expression (1) for the variable magnification optical system according to the first embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the height of an off-axis light flux made incident from the first lens group to the second lens group from the optical axis largely varies in connection with zooming. Consequently, the variation in the astigmatism becomes excessively large upon zooming, so that the realization of high optical performance is impossible. Additionally, in order to attain the advantageous effect of the present application more surely, it is more preferable to set the upper limit value of the conditional expression (1) to 1.120.

The conditional expression (2) defines a proper range of the focal length of the first lens group. The variable magnification optical system according to the first embodiment of the present application can suppress the variation in the spherical aberration and the variation in the astigmatism upon zooming, by satisfying the conditional expression (2).

When the value of f1/ft is equal to or falls below the lower limit of the conditional expression (2) for the variable magnification optical system according to the first embodiment of the present application, it becomes difficult to suppress the variation in the spherical aberration and the variation in the astigmatism occurring in the first lens group upon zooming, with the result that high optical performance cannot be realized. Meanwhile, in order to attain the advantageous effect of the present application more surely, it is more preferable to set the lower limit value of the conditional expression (2) to 0.421.

On the other hand, when the value of f1/ft is equal to or exceeds the upper limit of the conditional expression (2) for the variable magnification optical system according to the first embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the ratio of the diameter of an on-axis light flux incident on the first lens group to the diameter of an on-axis light flux incident on the second lens group largely varies in connection with zooming. Consequently, the variation in the spherical aberration becomes excessively large upon zooming, so that the realization of high optical performance is impossible. Additionally, in order to attain the advantageous effect of the present application more surely, it is more preferable to set the upper limit value of the conditional expression (2) to 0.530.

With the above described construction, it is possible to realize a variable magnification optical system that has a high variable magnification ratio, is compact in size and has high optical performance.

In the variable magnification optical system according to the first embodiment of the present application, it is desirable that the following conditional expression (3) is satisfied:

$$5.300 < f1/(-f2) < 8.500 \quad (3)$$

where f1 denotes a focal length of the first lens group, and f2 denotes a focal length of the second lens group.

The conditional expression (3) defines a proper range of the ratio of focal length between the first lens group and the second lens group. By satisfying the conditional expression (3), the variable magnification optical system according to the first embodiment of the present application can suppress variation in the spherical aberration and variation in the astigmatism upon zooming.

When the value of f1/(-f2) is equal to or falls below the lower limit of the conditional expression (3) for the variable magnification optical system according to the first embodiment of the present application, negative spherical aberration occurring in the first lens group in the telephoto end state becomes excessively large. Consequently, the variation in the spherical aberration becomes excessively large upon zooming, so that the realization of high optical performance is impossible. Meanwhile, in order to attain the advantageous effect of the present application more surely, it is more preferable to set the lower limit value of the conditional expression (3) to 5.800. Additionally, in order to attain the advantageous effect of the present application more surely, it is more preferable to set the lower limit value of the conditional expression (3) to 6.250. Further, in order to attain the advantageous effect of the present application more surely, it is more preferable to set the lower limit value of the conditional expression (3) to 6.750.

On the other hand, when the value of f1/(-f2) is equal to or exceeds the upper limit of the conditional expression (3) for the variable magnification optical system according to the first embodiment of the present application, it becomes difficult to suppress the variation in the spherical aberration and variation in the astigmatism occurring in the second lens group upon zooming, with the result that high optical performance cannot be realized. Meanwhile, in order to attain the advantageous effect of the present application more surely, it is more preferable to set the upper limit value of the conditional expression (3) to 8.050. Further, in order to attain the advantageous effect of the present application more surely, it is more preferable to set the upper limit value of the conditional expression (3) to 7.700. Moreover, in order to attain the advantageous effect of the present application more surely, it is more preferable to set the upper limit value of the conditional expression (3) to 7.320.

In the variable magnification optical system according to the first embodiment of the present application, it is desirable that the third lens group is moved toward the object side upon zooming from the wide-angle end state to the telephoto end state. With such configuration, it is possible to make smaller the refractive power of the fourth lens group compared with a case wherein the third lens group is not moved to the object side. Consequently, it is possible to suppress the variation in the astigmatism occurring in the fourth lens group upon zooming.

In the variable magnification optical system according to the first embodiment of the present application, it is desirable that the first lens group is moved toward the object side upon zooming from the wide-angle end state to the telephoto end state. With such configuration, it is possible to suppress variation in the height of off-axis light flux passing through the first lens group from the optical axis upon zooming. Owing to this, the diameter of the first lens group can be made smaller, and also the variation in the astigmatism can be suppressed upon zooming.

In the variable magnification optical system according to the first embodiment of the present application, it is desirable that the fifth lens group has positive refractive power. With such construction, the usable magnification of the fifth lens group becomes smaller than the equi-magnification, and as a result, the composite focal length from the first lens group to the fourth lens group can be made relatively larger. Owing to this, influence, such as eccentric coma caused by eccentricity among the lenses occurring in the first lens group to the fourth lens group during manufacturing, can be reduced to be relatively smaller. Consequently, high optical performance can be realized.

In the variable magnification optical system according to the first embodiment of the present application, it is desirable that the distance between the first lens group and the second lens group is increased upon zooming from the wide-angle end state to the telephoto end state. With such construction, it is possible to increase the magnification of the second lens group. It is also possible to realize high variable magnification ratio efficiently and at the same time to suppress the variation in the spherical aberration and variation in the astigmatism upon zooming.

In the variable magnification optical system according to the first embodiment of the present application, it is desirable that the distance between the second lens group and the third lens group is decreased upon zooming from the wide-angle end state to the telephoto end state. With such construction, it is possible to increase the composite magnification of the third lens group and the fourth lens group. It is also possible to realize high variable magnification ratio efficiently and at the same time to suppress the variation in the spherical aberration and variation in the astigmatism upon zooming.

In the variable magnification optical system according to the first embodiment of the present application, it is desirable that the distance between the fourth lens group and the fifth lens group is increased upon zooming from the wide-angle end state to the telephoto end state. With such construction, it is possible to increase the composite magnification of the third lens group and the fourth lens group. It is also possible to realize high variable magnification ratio efficiently and at the same time to suppress the variation in the spherical aberration and variation in the astigmatism upon zooming.

In the variable magnification optical system according to the first embodiment of the present application, it is desirable that the following conditional expression (4) is satisfied:

$$0.040 < (-f2)/ft < 0.092 \quad (4)$$

where ft denotes a focal length of the variable magnification optical system in the telephoto end state, and f2 denotes a focal length of the second lens group.

The conditional expression (4) defines a proper range of the focal length of the second lens group.

The variable magnification optical system according to the first embodiment of the present application can suppress the variation in the spherical aberration and the variation in the astigmatism upon zooming, by satisfying the conditional expression (4).

When the value of $(-f2)/ft$ is equal to or falls below the lower limit of the conditional expression (4) for the variable magnification optical system according to the first embodiment of the present application, it becomes difficult to suppress the variation in the spherical aberration and the variation in the astigmatism occurring in the second lens group upon zooming, with the result that high optical performance cannot be realized. Meanwhile, in order to attain the advantageous effect of the present application more surely, it is more preferable to set the lower limit value of the conditional expression (4) to 0.050.

On the other hand, when the value of $(-f2)/ft$ is equal to or exceeds the upper limit of the conditional expression (4) for the variable magnification optical system according to the first embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the diameter of on-axis light flux made incident from the first lens group to the second lens group largely varies in connection with zooming. Consequently, the variation in the spherical aberration becomes excessively large upon zooming, so that the realization of high optical performance is impossible. Additionally, in order to attain the advantageous effect of the present application more surely, it is more preferable to set the upper limit value of the conditional expression (4) to 0.084.

In the variable magnification optical system according to the first embodiment of the present application, it is desirable that the following conditional expression (5) is satisfied:

$$5.000 < f1/fw < 7.800 \quad (5)$$

where fw denotes a focal length of the variable magnification optical system in the wide angle end state, and f1 denotes a focal length of the first lens group.

The conditional expression (5) defines a proper range of the focal length of the first lens group. The variable magnification optical system according to the first embodiment of the present application can suppress the variation in the spherical aberration and the variation in the astigmatism upon zooming, by satisfying the conditional expression (5).

When the value of f1/fw is equal to or falls below the lower limit of the conditional expression (5) for the variable magnification optical system according to the first embodiment of the present application, it becomes difficult to suppress the variation in the spherical aberration and the variation in the astigmatism occurring in the first lens group upon zooming, with the result that high optical performance cannot be realized. Meanwhile, in order to attain the advantageous effect of the present application more surely, it is more preferable to set the lower limit value of the conditional expression (5) to 5.800.

On the other hand, when the value of f1/fw is equal to or exceeds the upper limit of the conditional expression (5) for the variable magnification optical system according to the first embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the height of an off-axis light flux passing through the first lens group from the optical axis largely varies in connection with zooming. Consequently, the variation in the astigmatism becomes excessively large upon zooming, so that the realization of high optical performance is impossible. Additionally, in order to attain the advantageous effect of the present application more surely, it is more preferable to set the upper limit value of the conditional expression (5) to 7.550.

An optical apparatus of the present application is characterized in that it is equipped with the variable magnification optical system according to the first embodiment of the present application, having the above described configuration. Consequently, it is possible to realize an optical apparatus that has a high variable magnification ratio, is compact in size, and exhibits high optical performance.

A method for manufacturing the variable magnification optical system according to the first embodiment of the present application is characterized by a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising the steps of:

constructing the first lens group and the second lens group to satisfy the following conditional expressions (1) and (2):

$$0.650 < (-f2)/fw < 1.180 \quad (1)$$

$$0.300 < f1/ft < 0.555 \quad (2)$$

where fw denotes a focal length of the variable magnification optical system in a wide-angle end state, ft denotes a focal length of the variable magnification optical system in a telephoto end state, f1 denotes a focal length of the first lens group, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position. With this configuration, it is possible to manufacture a variable magnification optical system that has a high variable magnification ratio, is compact in size, and exhibits high optical performance.

A variable magnification optical system according to the second embodiment of the present application, an optical apparatus and a method for manufacturing the variable magnification optical system are explained below.

The variable magnification optical system according to the second embodiment of the present application is characterized in that the optical system comprises, in order from an object side: a first lens group having positive refractive power; a second lens group having negative refractive power; a third lens group having positive refractive power; a fourth lens group having positive refractive power; and a fifth lens group, and upon zooming from a wide-angle end state to a telephoto end state, a distance between the first lens group and the second lens group, a distance between the second lens group and the third lens group, and a distance between the third lens group and the fourth lens group, and a distance between fourth lens group and the fifth lens group are varied. With such configuration, the variable magnification optical system according to the second embodiment of the present application can realize the zooming from the wide-angle end state to the telephoto end state and can suppress variation in each of the distortion, astigmatism and spherical aberration in connection with the zooming.

Further, the variable magnification optical system according to the second embodiment of the present application is characterized in that the fifth lens group is fixed for its position upon zooming from the wide-angle end state to the telephoto end state. With such configuration, it is possible to vary the height of marginal light rays made incident from the fourth lens group to the fifth lens group from the optical axis upon zooming. Owing to this, the variation in the astigmatism can be suppressed more successfully upon zooming.

The variable magnification optical system according to the second embodiment of the present application is also characterized in that the following conditional expressions (1) and (4) are satisfied:

$$0.650 < (-f2)/fw < 1.180 \quad (1)$$

$$0.040 < (-f2)/ft < 0.092 \quad (4)$$

where fw denotes a focal length of the variable magnification optical system in the wide angle end state, ft denotes a focal length of the variable magnification optical system in the telephoto end state, and f2 denotes a focal length of the second lens group.

The conditional expression (1) defines a proper range of the focal length of the second lens group. The variable magnification optical system according to the second embodiment of the present application can suppress the variation in the spherical aberration and the variation in the astigmatism upon zooming, by satisfying the conditional expression (1).

When the value of (−f2)/fw is equal to or falls below the lower limit of the conditional expression (1) for the variable magnification optical system according to the second embodiment of the present application, it becomes difficult to suppress the variation in the spherical aberration and the variation in the astigmatism occurring in the second lens group upon zooming, with the result that high optical performance cannot be realized. Meanwhile, in order to attain the advantageous effect of the present application more surely, it is more preferable to set the lower limit value of the conditional expression (1) to 0.760.

On the other hand, when the value of (−f2)/fw is equal to or exceeds the upper limit of the conditional expression (1) for the variable magnification optical system according to the second embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the height of an off-axis light flux made incident from the first lens group to the second lens group from the optical axis largely varies in connection with zooming. Consequently, the variation in the astigmatism becomes excessively large upon zooming, so that the realization of high optical performance is impossible. Additionally, in order to attain the advantageous effect of the present application more surely, it is more preferable to set the upper limit value of the conditional expression (1) to 1.120.

The conditional expression (4) defines a proper range of the focal length of the second lens group. The variable magnification optical system according to the second embodiment of the present application can suppress the variation in the spherical aberration and the variation in the astigmatism upon zooming, by satisfying the conditional expression (4).

When the value of (−f2)/ft is equal to or falls below the lower limit of the conditional expression (4) for the variable magnification optical system according to the second embodiment of the present application, it becomes difficult to suppress the variation in the spherical aberration and the variation in the astigmatism occurring in the second lens group upon zooming, with the result that high optical performance cannot be realized. Meanwhile, in order to attain the advantageous effect of the present application more surely, it is more preferable to set the lower limit value of the conditional expression (4) to 0.050.

On the other hand, when the value of (−f2)/ft is equal to or exceeds the upper limit of the conditional expression (4) for the variable magnification optical system according to the second embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the diameter of an on-axis light flux made incident from the first lens group to the second lens group largely varies in connection with zooming. Consequently, the variation in the spherical aberration becomes excessively large upon zooming, so that the realization of high optical performance is impossible. Additionally, in order to attain the advantageous effect of the present application more surely, it is more preferable to set the upper limit value of the conditional expression (4) to 0.084.

With the above described construction, it is possible to realize a variable magnification optical system that has a high variable magnification ratio, is compact in size and has high optical performance.

In the variable magnification optical system according to the second embodiment of the present application, it is desirable that the following conditional expression (6) is satisfied:

$$5.300 < f1/(-f2) < 7.430 \qquad (6)$$

where f1 denotes a focal length of the first lens group, and f2 denotes a focal length of the second lens group.

The conditional expression (6) defines a proper range of the ratio of focal length between the first lens group and the second lens group. By satisfying the conditional expression (6), the variable magnification optical system according to the second embodiment of the present application can suppress variation in the spherical aberration and variation in the astigmatism upon zooming.

When the value of f1/(-f2) is equal to or falls below the lower limit of the conditional expression (6) for the variable magnification optical system according to the second embodiment of the present application, negative spherical aberration occurring in the first lens group in the telephoto end state becomes excessively large. Consequently, the variation in the spherical aberration becomes excessively large upon zooming, so that the realization of high optical performance is impossible. Meanwhile, in order to attain the advantageous effect of the present application more surely, it is more preferable to set the lower limit value of the conditional expression (6) to 5.800. Additionally, in order to attain the advantageous effect of the present application more surely, it is more preferable to set the lower limit value of the conditional expression (6) to 6.250. Further, in order to attain the advantageous effect of the present application more surely, it is more preferable to set the lower limit value of the conditional expression (6) to 6.750.

On the other hand, when the value of f1/(-f2) is equal to or exceeds the upper limit of the conditional expression (6) for the variable magnification optical system according to the second embodiment of the present application, it becomes difficult to suppress the variation in the spherical aberration and variation in the astigmatism occurring in the second lens group upon zooming, with the result that high optical performance cannot be realized. Meanwhile, in order to attain the advantageous effect of the present application more surely, it is more preferable to set the upper limit value of the conditional expression (6) to 7.320. Moreover, in order to attain the advantageous effect of the present application more surely, it is more preferable to set the upper limit value of the conditional expression (6) to 7.250.

In the variable magnification optical system according to the second embodiment of the present application, it is desirable that the third lens group is moved toward the object side upon zooming from the wide-angle end state to the telephoto end state. With such configuration, it is possible to make smaller the refractive power of the fourth lens group compared with a case wherein the third lens group is not moved to the object side. Consequently, it is possible to suppress the variation in the astigmatism occurring in the fourth lens group upon zooming.

In the variable magnification optical system according to the second embodiment of the present application, it is desirable that the first lens group is moved toward the object side upon zooming from the wide-angle end state to the telephoto end state. With such configuration, it is possible to suppress variation in the height of off-axis light flux passing through the first lens group from the optical axis upon zooming. Owing to this, the diameter of the first lens group can be made smaller, and also the variation in the astigmatism can be suppressed upon zooming.

In the variable magnification optical system according to the second embodiment of the present application, it is desirable that the fifth lens group has positive refractive power. With such construction, the usable magnification of the fifth lens group becomes smaller than the life-size magnification, and as a result, the composite focal length from the first lens group to the fourth lens group can be made relatively larger. Owing to this, influence, such as eccentric coma caused by eccentricity among the lenses occurring in the first lens group to the fourth lens group during manufacturing, can be reduced to be relatively smaller. Consequently, high optical performance can be realized.

In the variable magnification optical system according to the second embodiment of the present application, it is desirable that the distance between the first lens group and the second lens group is increased upon zooming from the wide-angle end state to the telephoto end state. With such construction, it is possible to increase the magnification of the second lens group. It is also possible to realize high variable magnification ratio efficiently and at the same time to suppress the variation in the spherical aberration and variation in the astigmatism upon zooming.

In the variable magnification optical system according to the second embodiment of the present application, it is desirable that the distance between the second lens group and the third lens group is decreased upon zooming from the wide-angle end state to the telephoto end state. With such construction, it is possible to increase the composite magnification of the third lens group and the fourth lens group. It is also possible to realize high variable magnification ratio efficiently and at the same time to suppress the variation in the spherical aberration and variation in the astigmatism upon zooming.

In the variable magnification optical system according to the second embodiment of the present application, it is desirable that the distance between the fourth lens group and the fifth lens group is increased upon zooming from the wide-angle end state to the telephoto end state. With such construction, it is possible to increase the composite magnification of the third lens group and the fourth lens group. It is also possible to realize high variable magnification ratio efficiently and at the same time to suppress the variation in the spherical aberration and variation in the astigmatism upon zooming.

In the variable magnification optical system according to the second embodiment of the present application, it is desirable that the following conditional expression (5) is satisfied:

$$5.000 < f1/fw < 7.800 \qquad (5)$$

where fw denotes a focal length of the variable magnification optical system in the wide-angle end state, and f1 denotes a focal length of the first lens group.

The conditional expression (5) defines a proper range of the focal length of the first lens group. The variable magnification optical system according to the second embodiment of the present application can suppress the variation in the spherical aberration and the variation in the astigmatism upon zooming, by satisfying the conditional expression (5).

When the value of f1/fw is equal to or falls below the lower limit of the conditional expression (5) for the variable magnification optical system according to the second embodiment of the present application, it becomes difficult to suppress the variation in the spherical aberration and the variation in the astigmatism occurring in the first lens group upon zooming, with the result that high optical performance cannot be realized. Meanwhile, in order to attain the advantageous effect of the present application more surely, it is more preferable to set the lower limit value of the conditional expression (5) to 5.800.

On the other hand, when the value of f1/fw is equal to or exceeds the upper limit of the conditional expression (5) for the variable magnification optical system according to the second embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the height of off-axis light flux passing through the first lens group from the optical axis largely varies in connection with zooming. Consequently, the variation in the astigmatism becomes excessively large upon zooming, so that the realization of high optical performance is impossible. Additionally, in order to attain the advantageous effect of the present application more surely, it is more preferable to set the upper limit value of the conditional expression (5) to 7.550.

An optical apparatus of the present application is characterized in that it is equipped with the variable magnification optical system according to the second embodiment of the present application, having the above described configuration. Consequently, it is possible to realize an optical apparatus that has a high variable magnification ratio, is compact in size, and exhibits high optical performance.

A method for manufacturing the variable magnification optical system according to the second embodiment of the present application is characterized by a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising the steps of:

constructing the second lens group to satisfy the following conditional expressions (1) and (4):

$$0.650<(-f2)/fw<1.180 \quad (1)$$

$$0.040<(-f2)/ft<0.092 \quad (4)$$

where fw denotes a focal length of the variable magnification optical system in a wide-angle end state, ft denotes a focal length of the variable magnification optical system in a telephoto end state, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position. With this configuration, it is possible to manufacture a variable magnification optical system that has a high variable magnification ratio, is compact in size, and exhibits high optical performance.

A variable magnification optical system according to the third embodiment of the present application, an optical apparatus and a method for manufacturing the variable magnification optical system are explained below.

The variable magnification optical system according to the third embodiment of the present application is characterized in that the optical system comprises, in order from an object side: a first lens group having positive refractive power; a second lens group having negative refractive power; a third lens group having positive refractive power; a fourth lens group having positive refractive power; and a fifth lens group; and upon zooming from a wide-angle end state to a telephoto end state, a distance between the first lens group and the second lens group, a distance between the second lens group and the third lens group, and a distance between the third lens group and the fourth lens group, and a distance between fourth lens group and the fifth lens group are varied. With such configuration, the variable magnification optical system according to the third embodiment of the present application can realize the zooming from the wide-angle end state to the telephoto end state and can suppress variation in each of the distortion, astigmatism and spherical aberration in connection with the zooming.

Further, the variable magnification optical system according to the third embodiment of the present application is characterized in that the fifth lens group is fixed for its position upon zooming from the wide-angle end state to the telephoto end state. With such configuration, it is possible to vary the height of marginal light rays made incident from the fourth lens group to the fifth lens group from the optical axis upon zooming. Owing to this, the variation in the astigmatism can be suppressed more successfully upon zooming.

The variable magnification optical system according to the third embodiment of the present application is also characterized in that the following conditional expressions (5) and (2) are satisfied:

$$5.000<f1/fw<7.800 \quad (5)$$

$$0.300<f1/ft<0.555 \quad (2)$$

where fw denotes a focal length of the variable magnification optical system in the wide angle end state, ft denotes a focal length of the variable magnification optical system in the telephoto end state, and f1 denotes a focal length of the first lens group.

The conditional expression (5) defines a proper range of the focal length of the first lens group. The variable magnification optical system according to the third embodiment of the present application can suppress the variation in the spherical aberration and the variation in the astigmatism upon zooming, by satisfying the conditional expression (5).

When the value of f1/fw is equal to or falls below the lower limit of the conditional expression (5) for the variable magnification optical system according to the third embodiment of the present application, it becomes difficult to suppress the variation in the spherical aberration and the variation in the astigmatism occurring in the first lens group upon zooming, with the result that high optical performance cannot be realized. Meanwhile, in order to attain the advantageous effect of the present application more surely, it is more preferable to set the lower limit value of the conditional expression (5) to 5.800.

On the other hand, when the value of f1/fw is equal to or exceeds the upper limit of the conditional expression (5) for the variable magnification optical system according to the third embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the height of an off-axis light flux passing through the first lens group from the optical axis largely varies in connection with zooming. Consequently, the variation in the astigmatism becomes excessively large upon zooming, so that the realization of high optical performance is impossible. Additionally, in order to attain the advantageous effect of the present application more surely, it is more preferable to set the upper limit value of the conditional expression (5) to 7.550.

The conditional expression (2) defines a proper range of the focal length of the first lens group. The variable magnification optical system according to the third embodiment of the present application can suppress the variation in the spherical aberration and the variation in the astigmatism upon zooming, by satisfying the conditional expression (2).

When the value of f1/ft is equal to or falls below the lower limit of the conditional expression (2) for the variable magnification optical system according to the third embodiment of the present application, it becomes difficult to suppress the variation in the spherical aberration and the variation in the astigmatism occurring in the first lens group upon zooming, with the result that high optical performance cannot be realized. Meanwhile, in order to attain the advantageous effect of the present application more surely, it is more preferable to set the lower limit value of the conditional expression (2) to 0.421.

On the other hand, when the value of f1/ft is equal to or exceeds the upper limit of the conditional expression (2) for the variable magnification optical system according to the third embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the ratio of the diameter of an on-axis light flux incident on the first lens group to the diameter of an on-axis light flux incident on the second lens group largely varies in connection with zooming. Consequently, the variation in the spherical aberration becomes excessively large upon zooming, so that the realization of high optical performance is impossible. Additionally, in order to attain the advantageous effect of the present application more surely, it is more preferable to set the upper limit value of the conditional expression (2) to 0.530.

With the above described construction, it is possible to realize a variable magnification optical system that has a high variable magnification ratio, is compact in size and has high optical performance.

In the variable magnification optical system according to the third embodiment of the present application, it is desirable that the following conditional expression (6) is satisfied:

$$5.300 < f1/(-f2) < 7.430 \quad (6)$$

where f1 denotes a focal length of the first lens group, and f2 denotes a focal length of the second lens group.

The conditional expression (6) defines a proper range of the ratio of focal length between the first lens group and the second lens group. By satisfying the conditional expression (6), the variable magnification optical system according to the third embodiment of the present application can suppress variation in the spherical aberration and variation in the astigmatism upon zooming.

When the value of f1/(-f2) is equal to or falls below the lower limit of the conditional expression (6) for the variable magnification optical system according to the third embodiment of the present application, negative spherical aberration occurring in the first lens group in the telephoto end state becomes excessively large. Consequently, the variation in the spherical aberration becomes excessively large upon zooming, so that the realization of high optical performance is impossible. Meanwhile, in order to attain the advantageous effect of the present application more surely, it is more preferable to set the lower limit value of the conditional expression (6) to 5.800. Additionally, in order to attain the advantageous effect of the present application more surely, it is more preferable to set the lower limit value of the conditional expression (6) to 6.250. Further, in order to attain the advantageous effect of the present application more surely, it is more preferable to set the lower limit value of the conditional expression (6) to 6.750.

On the other hand, when the value of f1/(-f2) is equal to or exceeds the upper limit of the conditional expression (6) for the variable magnification optical system according to the third embodiment of the present application, it becomes difficult to suppress the variation in the spherical aberration and variation in the astigmatism occurring in the second lens group upon zooming, with the result that high optical performance cannot be realized. Meanwhile, in order to attain the advantageous effect of the present application more surely, it is more preferable to set the upper limit value of the conditional expression (6) to 7.320. Moreover, in order to attain the advantageous effect of the present application more surely, it is more preferable to set the upper limit value of the conditional expression (6) to 7.250.

In the variable magnification optical system according to the third embodiment of the present application, it is desirable that the third lens group is moved toward the object side upon zooming from the wide-angle end state to the telephoto end state. With such configuration, it is possible to make smaller the refractive power of the fourth lens group compared with a case wherein the third lens group is not moved to the object side. Consequently, it is possible to suppress the variation in the astigmatism occurring in the fourth lens group upon zooming.

In the variable magnification optical system according to the third embodiment of the present application, it is desirable that the first lens group is moved toward the object side upon zooming from the wide-angle end state to the telephoto end state. With such configuration, it is possible to suppress variation in the height of off-axis light flux passing through the first lens group from the optical axis upon zooming. Owing to this, the diameter of the first lens group can be made smaller, and also the variation in the astigmatism can be suppressed upon zooming.

In the variable magnification optical system according to the third embodiment of the present application, it is desirable that the fifth lens group has positive refractive power. With such construction, the usable magnification of the fifth lens group becomes smaller than the life-size magnification, and as a result, the composite focal length from the first lens group to the fourth lens group can be made relatively larger. Owing to this, influence, such as eccentric coma caused by eccentricity among the lenses occurring in the first lens group to the fourth lens group during manufacturing, can be reduced to be relatively smaller. Consequently, high optical performance can be realized.

In the variable magnification optical system according to the third embodiment of the present application, it is desirable that the distance between the first lens group and the second lens group is increased upon zooming from the wide-angle end state to the telephoto end state. With such construction, it is possible to increase the magnification of the second lens group. It is also possible to realize high variable magnification ratio efficiently and at the same time to suppress the variation in the spherical aberration and variation in the astigmatism upon zooming.

In the variable magnification optical system according to the third embodiment of the present application, it is desirable that the distance between the second lens group and the third lens group is decreased upon zooming from the wide-angle end state to the telephoto end state. With such construction, it is possible to increase the composite magnification of the third lens group and the fourth lens group. It is also possible to realize high variable magnification ratio efficiently and at the same time to suppress the variation in the spherical aberration and variation in the astigmatism upon zooming.

In the variable magnification optical system according to the third embodiment of the present application, it is desirable that the distance between the fourth lens group and the fifth lens group is increased upon zooming from the wide-angle end state to the telephoto end state. With such construction, it is possible to increase the composite magnification of the third lens group and the fourth lens group. It is also possible to realize high variable magnification ratio efficiently and at the same time to suppress the variation in the spherical aberration and variation in the astigmatism upon zooming.

In the variable magnification optical system according to the third embodiment of the present application, it is desirable that the following conditional expression (4) is satisfied:

$$0.040 < (-f2)/ft < 0.092 \tag{4}$$

where ft denotes a focal length of the variable magnification optical system in the telephoto end state, and f2 denotes a focal length of the second lens group.

The conditional expression (4) defines a proper range of the focal length of the second lens group. The variable magnification optical system according to the third embodiment of the present application can suppress the variation in the spherical aberration and the variation in the astigmatism upon zooming, by satisfying the conditional expression (4).

When the value of $(-f2)/ft$ is equal to or falls below the lower limit of the conditional expression (4) for the variable magnification optical system according to the third embodiment of the present application, it becomes difficult to suppress the variation in the spherical aberration and the variation in the astigmatism occurring in the second lens group upon zooming, with the result that high optical performance cannot be realized. Meanwhile, in order to attain the advantageous effect of the present application more surely, it is more preferable to set the lower limit value of the conditional expression (4) to 0.050.

On the other hand, when the value of $(-f2)/ft$ is equal to or exceeds the upper limit of the conditional expression (4) for the variable magnification optical system according to the third embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the diameter of on-axis light flux made incident from the first lens group to the second lens group largely varies in connection with zooming. Consequently, the variation in the spherical aberration becomes excessively large upon zooming, so that the realization of high optical performance is impossible. Additionally, in order to attain the advantageous effect of the present application more surely, it is more preferable to set the upper limit value of the conditional expression (4) to 0.084.

An optical apparatus of the present application is characterized in that it is equipped with the variable magnification optical system according to the third embodiment of the present application, having the above described configuration. Consequently, it is possible to realize an optical apparatus that has a high variable magnification ratio, is compact in size, and exhibits high optical performance.

A method for manufacturing the variable magnification optical system according to the third embodiment of the present application is characterized by a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising the steps of:

constructing the first lens group to satisfy the following conditional expressions (5) and (2):

$$5.000 < f1/fw < 7.800 \tag{5}$$

$$0.300 < f1/ft < 0.555 \tag{2}$$

where fw denotes a focal length of the variable magnification optical system in a wide-angle end state, ft denotes a focal length of the variable magnification optical system in a telephoto end state, and f1 denotes a focal length of the first lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position. With this configuration, it is possible to manufacture a variable magnification optical system that has a high variable magnification ratio, is compact in size, and exhibits high optical performance.

Hereinafter, variable magnification optical systems relating to numerical examples according to the first to the third embodiments of the present application will be explained with reference to the accompanying drawings. Meanwhile, the first to the fourth examples are common to all of the first to the third embodiments.

First Example

FIGS. 1A, 1B, 1C, 1D and 1E are sectional views showing a variable magnification optical system according to a first Example that is common to the first to the third embodiments of the present application, in a wide angle end state, in a first intermediate focal length state, in a second intermediate focal length state, in a third intermediate focal length state, and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power; and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a negative meniscus lens L24 having a concave surface facing the object side. Note that the negative meniscus lens L21 is a glass mold type aspherical lens having an object side lens surface formed into an aspherical shape.

The third lens group G3 consists of a cemented lens constructed by, in order from the object side, a negative meniscus lens L31 having a convex surface facing the object side cemented with a double convex positive lens L32. Note that an aperture stop S is provided on the object side of the third lens group G3.

The fourth lens group G4 consists of, in order from the object side, a cemented lens constructed by a double convex positive lens L41 cemented with a double concave negative lens L42, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Note that the negative meniscus lens L48 is a glass mold type aspherical lens having an image side lens surface formed into an aspherical shape.

The fifth lens group G5 consists of a cemented lens constructed by, in order from the object side, a positive meniscus lens L51 having a concave surface facing the object side cemented with a negative meniscus lens L52 having a concave surface facing the object side. Note that the negative meniscus lens L52 is a glass mold type aspherical lens having an image side lens surface formed into an aspherical shape.

In the variable magnification optical system according to the present Example, having the above described construction, upon zooming from the wide angle end state to the telephoto end state, the first lens group G1 to the fourth lens group G4 are moved along the optical axis such that an air distance between the first lens group G1 and the second lens group G2, an air distance between the second lens group G2 and the third lens group G3, an air distance between the third lens group G3 and the fourth lens group G4, and an air distance between the fourth lens group G4 and the fifth lens group G5 are varied.

More specifically, the first lens group G1, the third lens group G3 and the fourth lens group G4 are moved toward the object side upon zooming. The second lens group G2 is moved toward the object side from the wide angle end state to the third intermediate focal length state and is moved toward the image side from the third intermediate focal length state to the telephoto end state. The fifth lens group G5 is fixed for its position in the direction of an optical axis upon zooming. Incidentally, the aperture stop S is moved toward the object side integrally with the fourth lens group G4 upon zooming.

Thus, upon zooming, the air distance between the first lens group G1 and the second lens group G2 is increased, the air distance between the second lens group G2 and the third lens group G3 is decreased, and the air distance between the fourth lens group G4 and the fifth lens group G5 is increased. The air distance between the third lens group G3 and the fourth lens group G4 is increased from the wide angle end state to the first intermediate focal length state, is decreased from the first intermediate focal length state to the second intermediate focal length state and is increased from the second intermediate focal length state to the telephoto end state. Also upon zooming, an air distance between the aperture stop S and the third lens group G3 is decreased from the wide angle end state to the first intermediate focal length state, is increased from the first intermediate focal length state to the second intermediate focal length state and is decreased from the second intermediate focal length state to the telephoto end state.

Table 1 below shows various values of the variable magnification optical system according to the present Example.

In Table 1, f denotes a focal length, and BF denotes a back focal length, in other words, a distance on the optical axis between the most image side lens surface and an image plane I.

In [Surface Data], m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 nm) and vd denotes an Abbe number for d-line (wavelength λ=587.6 nm). Further, OP denotes an object surface, and I denotes an image plane. Meanwhile, radius of curvature r=∞ denotes a plane surface. The position of an aspherical surface is expressed by attaching "*" to the surface number, and in the column of the radius of curvature r, a paraxial radius of curvature is shown. A refractive index of air nd=1.000000 is omitted.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+[1-\kappa(h/r)^2]^{1/2}]+A4h^4+A6h^6+A8h^8+A10h^{10}+A12h^{12}$$

where h denotes a vertical height from the optical axis, x denotes a sag amount which is a distance along the optical axis from the tangent surface at the vertex of the aspherical surface to the aspherical surface at the vertical height h, κ denotes a conical coefficient, A4, A6, A8, A10 and A12 denote respective aspherical coefficients, and r denotes a paraxial radius of curvature that is a radius of curvature of a reference sphere. "E-n", where n is an integer, denotes "×10$^{-n}$", for example, "1.234E-05" denotes "1.234×10$^{-5}$". The 2nd order aspherical surface coefficient A2 is 0, and omitted in the description.

In [Various Data], FNO denotes an F-number, ω denotes a half angle of view (unit "°"), Y denotes an image height, TL denotes a total length of the variable magnification optical system, that is, a distance along the optical axis from the first surface to the image plane I upon focusing on an infinite distant object, dφ denotes a variable interval between an n-th surface and an (n+1)-th surface, and φ is an aperture diameter of an aperture stop S. Meanwhile, W denotes a wide-angle end state, M1 denotes a first intermediate focal length state, M2 denotes a second intermediate focal length state, M3 denotes a third intermediate focal length state, and T denotes a telephoto end state.

In [Lens Group Data], there are shown a starting surface number ST and a focal length f of each lens group.

In [Values for Conditional Expressions], values corresponding to respective conditional expressions for the variable magnification optical system according to the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced for its dimension, the unit is not necessarily to be limited to "mm".

The reference symbols in Table 1 described above are also used in Tables for the other Examples provided later in the same way.

TABLE 1

First Example

[Surface Data]

| m | r | d | nd | vd |
|---|---|---|---|---|
| OP | ∞ | | | |
| 1 | 165.4019 | 1.6350 | 1.902650 | 35.73 |
| 2 | 41.8893 | 9.2560 | 1.497820 | 82.57 |
| 3 | −178.4364 | 0.1000 | | |
| 4 | 42.8430 | 5.1140 | 1.729160 | 54.61 |
| 5 | 515.0653 | d5 | | |
| *6 | 500.0000 | 1.0000 | 1.851350 | 40.10 |
| 7 | 9.0059 | 4.2479 | | |
| 8 | −16.6413 | 1.0000 | 1.883000 | 40.66 |
| 9 | 50.8442 | 0.7538 | | |
| 10 | 32.1419 | 3.0566 | 1.808090 | 22.74 |
| 11 | −18.1056 | 1.0000 | 1.883000 | 40.66 |
| 12 | −29.3627 | d12 | | |
| 13 | ∞ | d13 | | Aperture Stop S |
| 14 | 27.1583 | 1.0000 | 1.883000 | 40.66 |
| 15 | 14.3033 | 3.4259 | 1.593190 | 67.90 |
| 16 | −43.0421 | d16 | | |
| 17 | 12.5000 | 8.2427 | 1.670030 | 47.14 |
| 18 | −79.2339 | 1.0000 | 1.883000 | 40.66 |
| 19 | 11.4345 | 2.0000 | | |
| 20 | 18.9834 | 3.3397 | 1.518600 | 69.89 |
| 21 | −12.4126 | 1.0000 | 1.850260 | 32.35 |
| 22 | −22.7118 | 1.5000 | | |
| 23 | −46.2616 | 1.0000 | 1.902650 | 35.73 |
| 24 | 11.4391 | 3.5033 | 1.581440 | 40.98 |
| 25 | −30.7870 | 0.1000 | | |
| 26 | 28.7953 | 5.0986 | 1.581440 | 40.98 |
| 27 | −8.8012 | 1.0000 | 1.820800 | 42.71 |
| *28 | −35.2149 | d28 | | |
| 29 | −40.0000 | 1.6432 | 1.497820 | 82.57 |
| 30 | −19.4318 | 1.0000 | 1.834410 | 37.28 |
| *31 | −22.7996 | BF | | |
| I | ∞ | | | |

[Aspherical Data]

| m | 6 |
|---|---|
| κ | 11.00000 |
| A4 | 3.95289E−05 |
| A6 | −2.04622E−07 |
| A8 | −4.81392E−09 |
| A10 | 9.83575E−11 |
| A12 | −5.88880E−13 |
| m | 28 |
| κ | 1.0000 |
| A4 | −5.59168E−05 |
| A6 | −2.20298E−07 |
| A8 | 3.87818E−10 |
| A10 | 1.16318E−11 |
| A12 | 0.00000 |
| m | 31 |
| κ | 1.00000 |
| A4 | 2.65930E−05 |
| A6 | 7.69228E−08 |
| A8 | −1.34346E−09 |
| A10 | 0.00000 |

TABLE 1-continued

First Example

| A12 | 0.00000 |
|---|---|

[Various Data]
Variable magnification ratio 14.14

| | W | | T |
|---|---|---|---|
| f | 9.47 | ~ | 133.87 |
| FNO | 4.12 | ~ | 5.78 |
| ω | 41.95 | ~ | 3.27° |
| Y | 8.00 | ~ | 8.00 |
| TL | 112.25 | ~ | 165.65 |

| | W | M1 | M2 | M3 | T |
|---|---|---|---|---|---|
| f | 9.47002 | 17.83631 | 60.50026 | 90.50043 | 133.87072 |
| ω | 41.95497 | 23.18274 | 7.18201 | 4.82759 | 3.26779 |
| FNO | 4.12 | 5.24 | 5.77 | 5.77 | 5.78 |
| φ | 8.52 | 8.52 | 9.55 | 10.30 | 11.04 |
| d5 | 2.10000 | 12.15693 | 36.10717 | 41.77210 | 46.27797 |
| d12 | 24.77744 | 16.39929 | 5.66327 | 3.74451 | 2.20000 |
| d13 | 5.18928 | 3.23115 | 4.53928 | 3.63928 | 1.80000 |
| d16 | 2.25000 | 4.20813 | 2.90000 | 3.80000 | 5.63928 |
| d28 | 1.86861 | 12.02032 | 28.59900 | 32.29005 | 33.66620 |
| BF | 14.04947 | 14.04956 | 14.04989 | 14.04993 | 14.05005 |

[Lens Group Data]

| | ST | f |
|---|---|---|
| G1 | 1 | 68.08250 |
| G2 | 6 | −9.98760 |
| G3 | 14 | 38.80284 |
| G4 | 17 | 60.78065 |
| G5 | 29 | 129.99998 |

[Values for Conditional Expressions]

| (1) | (−f2)/fw = 1.055 |
|---|---|
| (2) | f1/ft = 0.509 |
| (3), (6) | f1/(−f2) = 6.817 |
| (4) | (−f2)/ft = 0.075 |
| (5) | f1/fw = 7.189 |

Figure 2A:
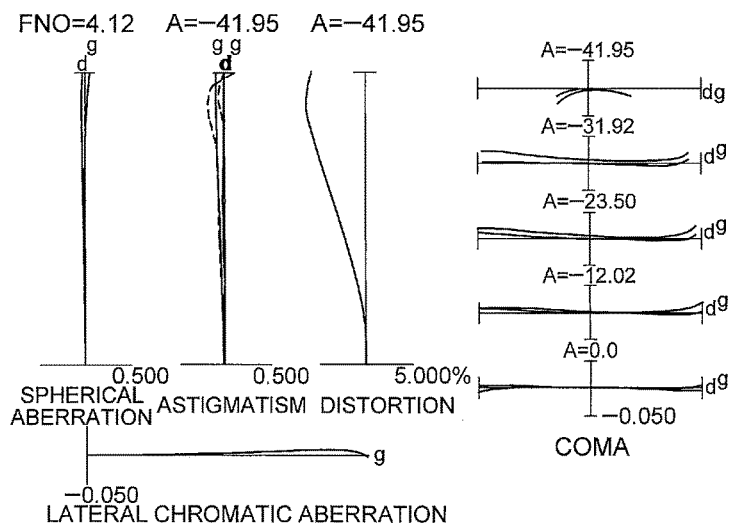
FIGS. 2A, 2B and 2C are graphs showing various aberrations of the variable magnification optical system according to the First Example of the present application upon focusing on an infinite distance object, in the wide-angle end state, in the first intermediate focal length state, and in the second intermediate focal length state, respectively.
Figure 2B:
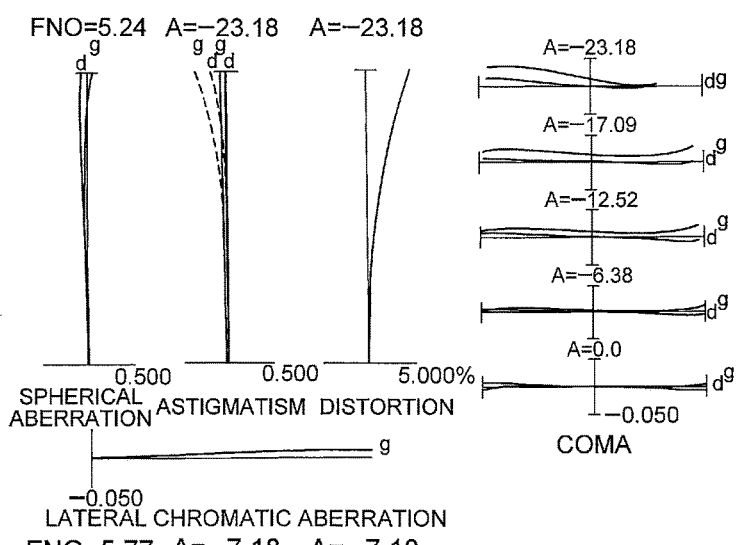
Figure 2C:
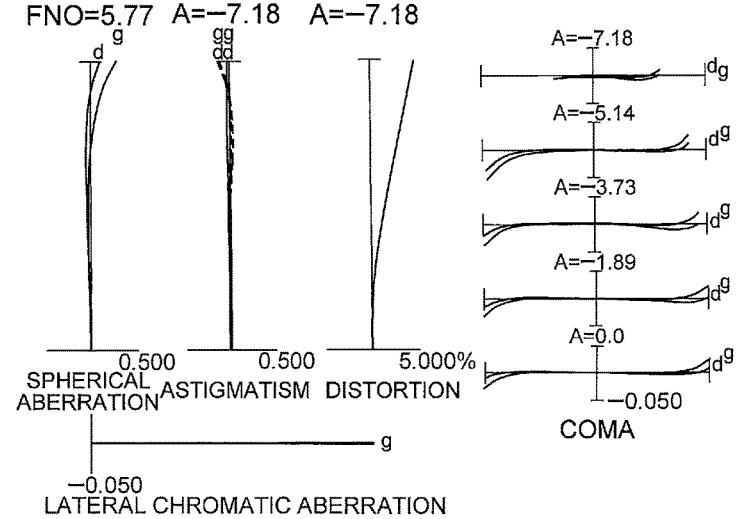

FIGS. 2A, 2B and 2C are graphs showing various aberrations of the variable magnification optical system according to the First Example of the present application upon focusing on an infinite distance object, in a wide angle end state, in a first intermediate focal length state, and in a second intermediate focal length state, respectively.

Figure 3A:
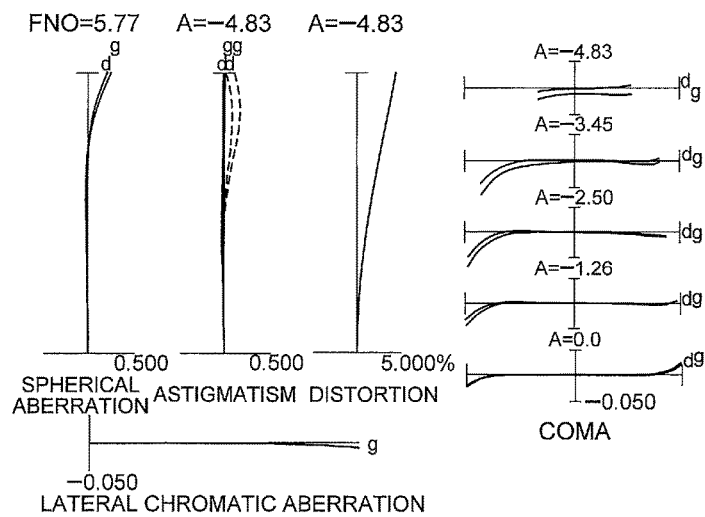
FIGS. 3A and 3B are graphs showing various aberrations of the variable magnification optical system according to the First Example of the present application upon focusing on an infinite distance object, in the third intermediate focal length state, and in the telephoto end state, respectively.
Figure 3B:
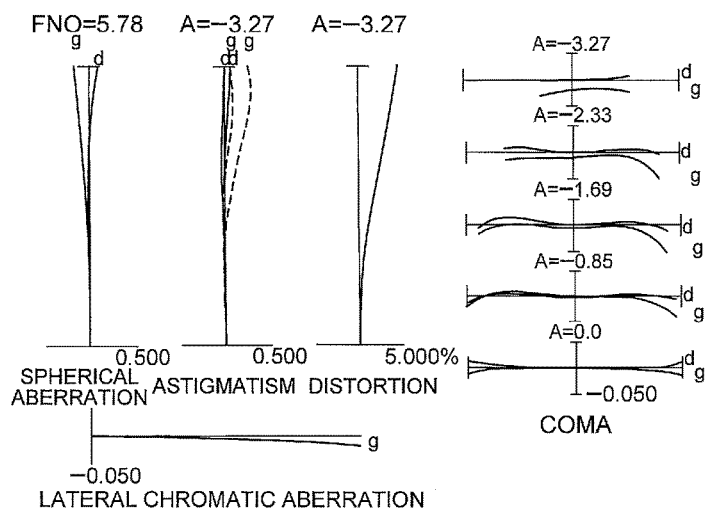
Figure 4A:
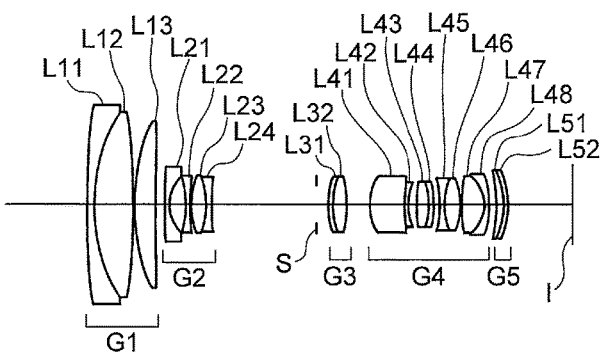
FIGS. 4A, 4B, 4C, 4D and 4E are sectional views showing a variable magnification optical system according to a Second Example that is common to the first to the third embodiments of the present application, in a wide-angle end state, in a first intermediate focal length state, in a second intermediate focal length state, in a third intermediate focal length state, and in a telephoto end state, respectively.
Figure 4B:
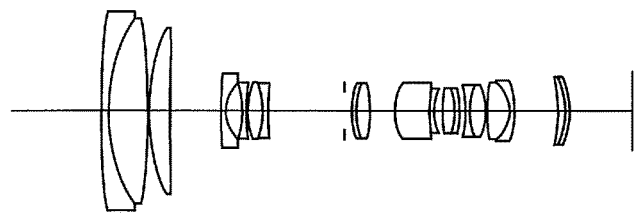
Figure 4C:
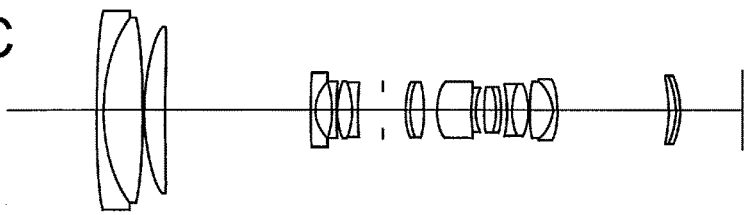
Figure 4D:
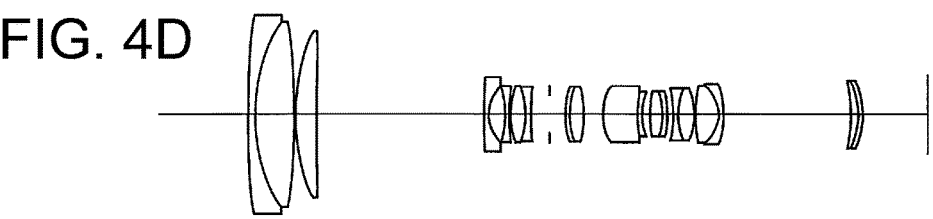
Figure 4E:
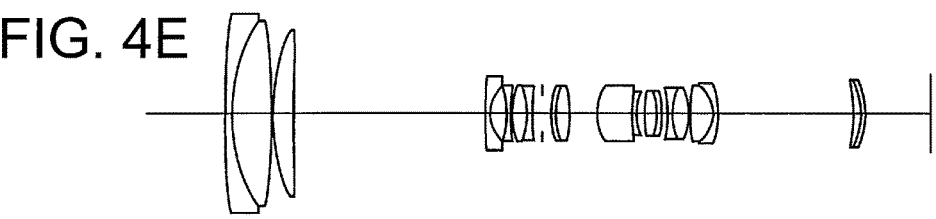

FIGS. 3A and 3B are graphs showing various aberrations of the variable magnification optical system according to the First Example of the present application upon focusing on an infinite distance object, in a third intermediate focal length state, and in a telephoto end state, respectively.

In respective aberration graphs, FNO denotes an F-number, and A denotes an incidence angle of light ray, that is, a half angle of view (unit "°"). In the graphs, d denotes an aberration curve at d-line (wavelength 587.6 nm), g denotes an aberration curve at g-line (wavelength 435.8 nm), and a curve not accompanied by d and g denotes an aberration at the d-line. In the graph showing astigmatism, a solid line indicates a sagittal image plane, and a broken line indicates a meridional image plane. Incidentally, the same symbols as in the present Example are used also in various aberration graphs in the other Examples given later.

As is apparent from the respective aberration graphs, the variable magnification optical system according to the present Example shows superb optical performance as a result of good corrections to various aberrations in the states from the wide-angle end state to the telephoto end state.

Second Example

FIGS. 4A, 4B, 4C, 4D and 4E are sectional views showing a variable magnification optical system according to a Second Example that is common to the first to the third embodiments of the present application, in a wide angle end state, in a first intermediate focal length state, in a second intermediate focal length state, in a third intermediate focal length state, and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power; and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a double concave negative lens L24. Note that the negative meniscus lens L21 is a glass mold type aspherical lens having an object side lens surface formed into an aspherical shape.

The third lens group G3 consists of a cemented lens constructed by, in order from the object side, a negative meniscus lens L31 having a convex surface facing the object side cemented with a double convex positive lens L32. Note that an aperture stop S is provided on the object side of the third lens group G3.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Note that the negative meniscus lens L48 is a glass mold type aspherical lens having an image side lens surface formed into an aspherical shape.

The fifth lens group G5 consists of a cemented lens constructed by, in order from the object side, a positive meniscus lens L51 having a concave surface facing the object side cemented with a negative meniscus lens L52 having a concave surface facing the object side. Note that the negative meniscus lens L52 is a glass mold type aspherical lens having an image side lens surface formed into an aspherical shape.

In the variable magnification optical system according to the present Example, having the above described construction, upon zooming from the wide angle end state to the telephoto end state, the first lens group G1 to the fourth lens group G4 are moved along the optical axis such that an air distance between the first lens group G1 and the second lens group G2, an air distance between the second lens group G2 and the third lens group G3, an air distance between the third lens group G3 and the fourth lens group G4, and an air distance between the fourth lens group G4 and the fifth lens group G5 are varied.

More specifically, the first lens group G1, the third lens group G3 and the fourth lens group G4 are moved toward the object side upon zooming. The second lens group G2 is moved toward the object side from the wide angle end state to the third intermediate focal length state and is moved toward the image side from the third intermediate focal length state to the telephoto end state. The fifth lens group G5 is fixed for its position in the direction of an optical axis upon zooming. Incidentally, the aperture stop S is moved toward the object side integrally with the fourth lens group G4 upon zooming.

Thus, upon zooming, the air distance between the first lens group G1 and the second lens group G2 is increased, the air distance between the second lens group G2 and the third lens group G3 is decreased, and the air distance between the fourth lens group G4 and the fifth lens group G5 is increased. The air distance between the third lens group G3 and the fourth lens group G4 is increased from the wide angle end state to the first intermediate focal length state, is decreased from the first intermediate focal length state to the second intermediate focal length state and is increased from the second intermediate focal length state to the telephoto end state. Also upon zooming, the air distance between the aperture stop S and the third lens group G3 is decreased from the wide angle end state to the first intermediate focal length state, is increased from the first intermediate focal length state to the second intermediate focal length state and is decreased the second intermediate focal length state to the telephoto end state.

Table 2 below shows various values of the variable magnification optical system according to the present Example.

TABLE 2

Second Example

[Surface Data]

| m | r | d | nd | vd |
|---|---|---|---|---|
| OP | ∞ | | | |
| 1 | 149.1393 | 1.6350 | 1.902650 | 35.73 |
| 2 | 39.3210 | 9.1912 | 1.497820 | 82.57 |
| 3 | −200.0000 | 0.1000 | | |
| 4 | 41.9637 | 5.4484 | 1.729160 | 54.61 |
| 5 | 1039.4250 | d5 | | |
| *6 | 500.0000 | 1.0000 | 1.851350 | 40.10 |
| 7 | 9.7424 | 3.8435 | | |
| 8 | −27.3991 | 1.0000 | 1.883000 | 40.66 |
| 9 | 89.0051 | 0.2895 | | |
| 10 | 21.6984 | 3.7554 | 1.808090 | 22.74 |
| 11 | −15.0205 | 1.0000 | 1.883000 | 40.66 |
| 12 | 103.6128 | d12 | | |
| 13 | ∞ | d13 | | Aperture Stop S |
| 14 | 26.3876 | 1.0000 | 1.883000 | 40.66 |
| 15 | 13.2001 | 3.5030 | 1.593190 | 67.90 |
| 16 | −39.4805 | d16 | | |
| 17 | 12.5000 | 8.2088 | 1.743200 | 49.26 |
| 18 | 25.6321 | 1.0000 | 1.834000 | 37.18 |
| 19 | 9.6066 | 2.0000 | | |
| 20 | 17.4828 | 3.0696 | 1.516800 | 63.88 |
| 21 | −13.7429 | 1.0000 | 1.850260 | 32.35 |
| 22 | −25.6259 | 1.5000 | | |
| 23 | −19.7745 | 1.0000 | 1.850260 | 32.35 |
| 24 | 12.4270 | 3.9453 | 1.620040 | 36.40 |
| 25 | −17.2177 | 0.3559 | | |
| 26 | 44.5160 | 5.3272 | 1.581440 | 40.98 |
| 27 | −8.1562 | 1.0000 | 1.820800 | 42.71 |
| *28 | −28.1926 | d28 | | |

TABLE 2-continued

Second Example

| 29 | −40.0000 | 1.7646 | 1.497820 | 82.57 |
|---|---|---|---|---|
| 30 | −18.8409 | 1.0000 | 1.834410 | 37.28 |
| *31 | −25.0038 | BF | | |
| I | ∞ | | | |

[Aspherical Data]

| m | 6 |
|---|---|
| κ | 10.29120 |
| A4 | 1.05982E−05 |
| A6 | 1.47868E−07 |
| A8 | −6.64708E−09 |
| A10 | 8.77431E−11 |
| A12 | −4.23990E−13 |
| m | 28 |
| κ | 1.0000 |
| A4 | −7.26393E−05 |
| A6 | −3.38257E−07 |
| A8 | 1.26743E−09 |
| A10 | −2.83030E−11 |
| A12 | 0.00000 |
| m | 31 |
| κ | 1.00000 |
| A4 | 2.68564E−05 |
| A6 | 7.91224E−08 |
| A8 | −8.06538E−10 |
| A10 | 0.00000 |
| A12 | 0.00000 |

[Various Data]
Variable magnification ratio 14.13

| | W | T |
|---|---|---|
| f | 10.30 | ~ 145.50 |
| FNO | 4.08 | ~ 5.71 |
| ω | 39.62 | ~ 3.01° |
| Y | 8.00 | ~ 8.00 |
| TL | 112.60 | ~ 162.60 |

| | W | M1 | M2 | M3 | T |
|---|---|---|---|---|---|
| f | 10.30001 | 18.00395 | 60.55030 | 89.50052 | 145.50102 |
| ω | 39.61866 | 23.08393 | 7.20247 | 4.88583 | 3.00545 |
| FNO | 4.08 | 4.79 | 5.49 | 5.75 | 5.72 |
| φ | 9.01 | 9.02 | 9.02 | 9.26 | 10.08 |
| d5 | 2.10000 | 11.86757 | 33.84673 | 38.94667 | 43.98780 |
| d12 | 24.38938 | 17.21960 | 5.86923 | 4.42463 | 2.20000 |
| d13 | 2.46923 | 1.80000 | 4.59702 | 3.69702 | 1.80000 |
| d16 | 5.02779 | 5.69702 | 2.90000 | 3.80000 | 5.69702 |
| d28 | 1.62642 | 10.35671 | 26.30176 | 30.05048 | 31.92800 |
| BF | 14.04946 | 14.04953 | 14.04979 | 14.04990 | 14.05006 |

[Lens Group Data]

| | ST | f |
|---|---|---|
| G1 | 1 | 64.91265 |
| G2 | 6 | −9.00339 |
| G3 | 14 | 38.07719 |
| G4 | 17 | 46.69911 |
| G5 | 29 | 260.10501 |

[Values for Conditional Expressions]

| (1) | (−f2)/fw = 0.874 |
|---|---|
| (2) | f1/ft = 0.446 |
| (3), (6) | f1/(−f2) = 7.210 |
| (4) | (−f2)/ft = 0.062 |
| (5) | f1/fw = 6.302 |

Figure 5A:
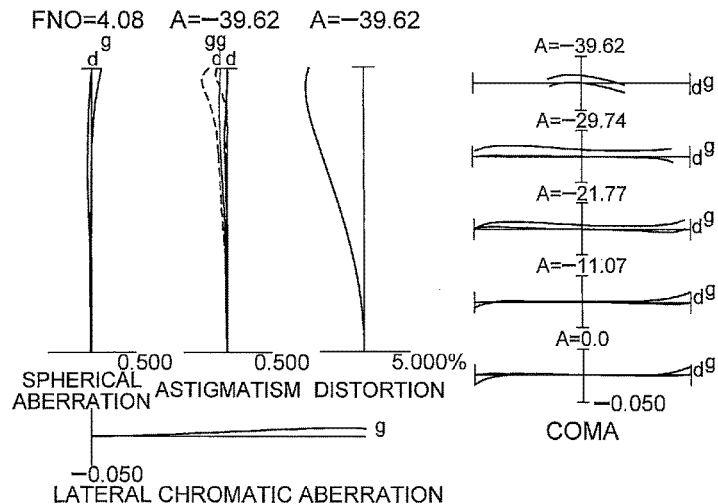
FIGS. 5A, 5B and 5C are graphs showing various aberrations of the variable magnification optical system according to the Second Example of the present application upon focusing on an infinite distance object, in the wide-angle end state, in the first intermediate focal length state, and in the second intermediate focal length state, respectively.
Figure 5B:
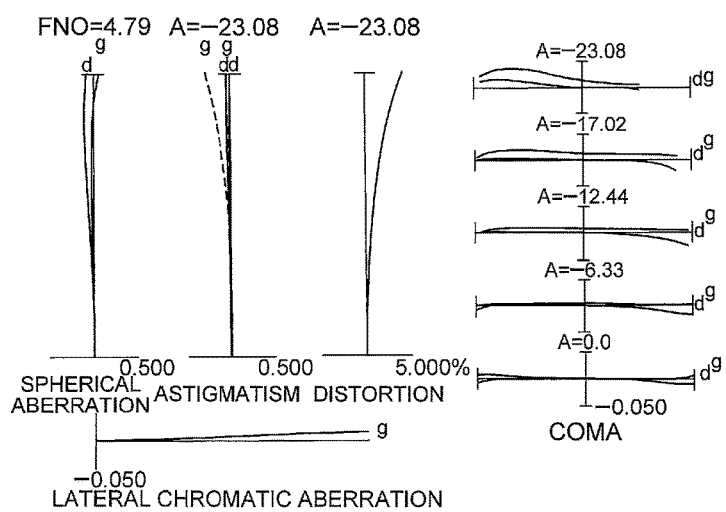
Figure 5C:
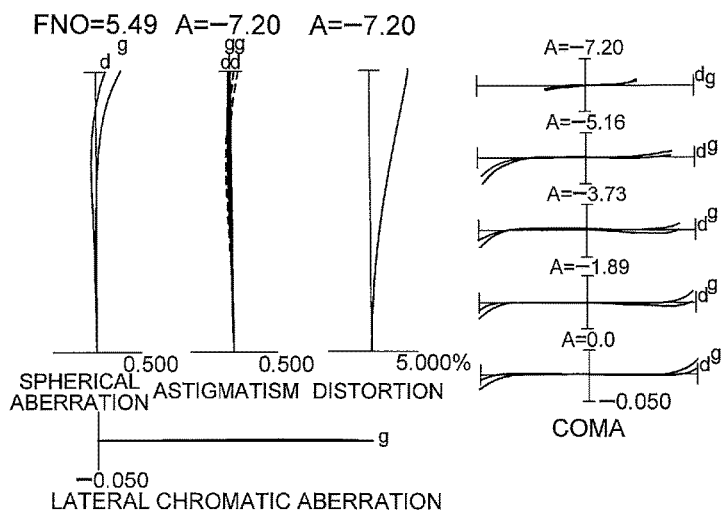

FIGS. 5A, 5B and 5C are graphs showing various aberrations of the variable magnification optical system according to the Second Example of the present application upon focusing on an infinite distance object, in a wide angle end state, in a first intermediate focal length state, and in a second intermediate focal length state, respectively.

Figure 6A:
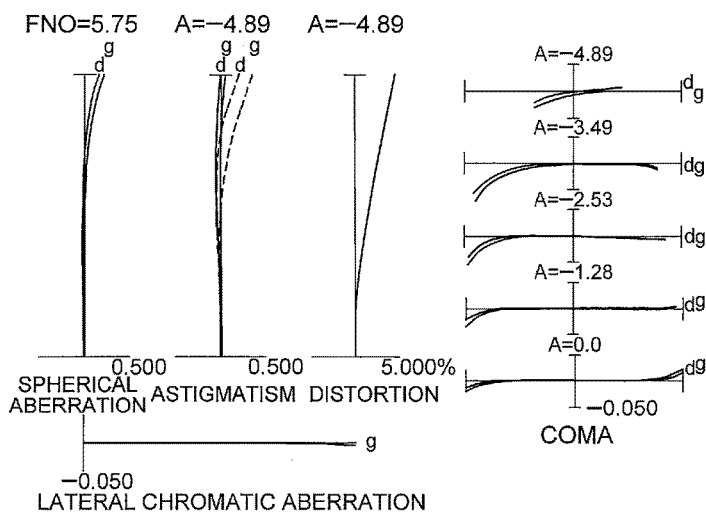
FIGS. 6A and 6B are graphs showing various aberrations of the variable magnification optical system according to the Second Example of the present application upon focusing on an infinite distance object, in the third intermediate focal length state, and in the telephoto end state, respectively.
Figure 6B:
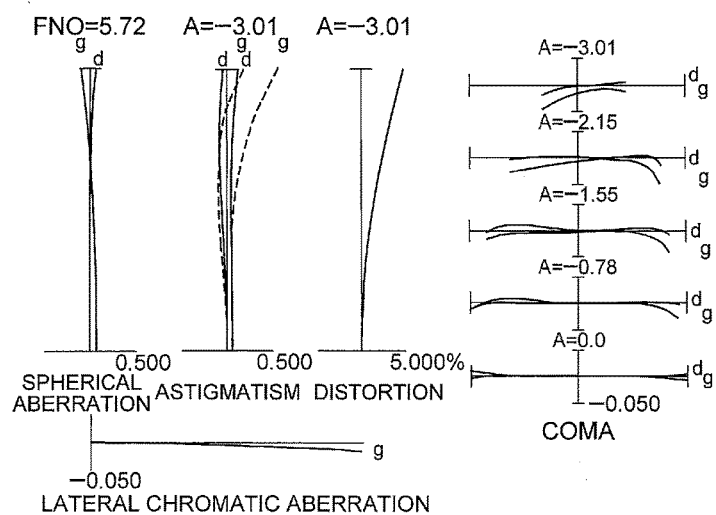
Figure 7A:
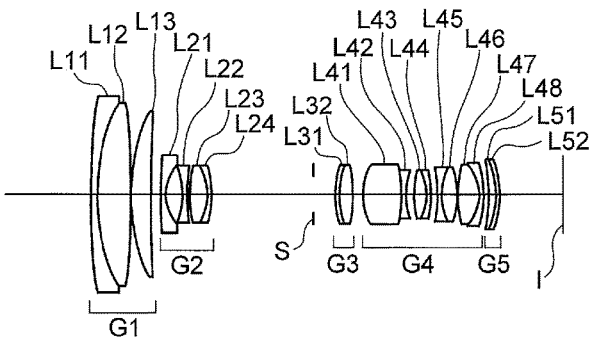
FIGS. 7A, 7B, 7C, 7D and 7E are sectional views showing a variable magnification optical system according to a Third Example that is common to the first to the third embodiments of the present application, in a wide-angle end state, in a first intermediate focal length state, in a second intermediate focal length state, in a third intermediate focal length state, and in a telephoto end state, respectively.
Figure 7B:
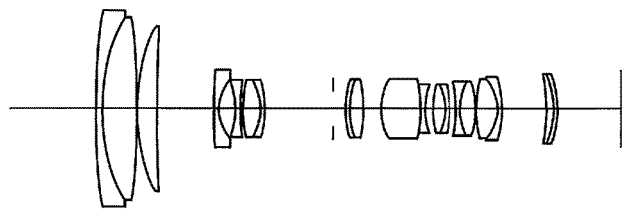
Figure 7C:
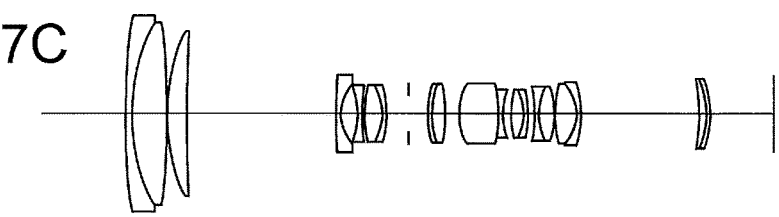
Figure 7D:
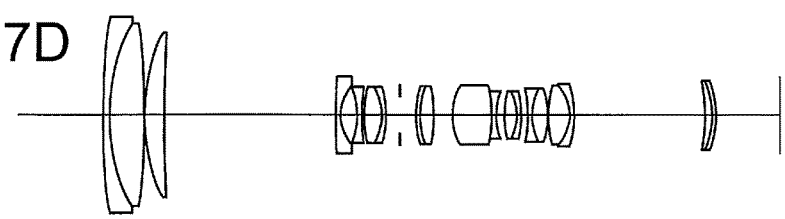
Figure 7E:
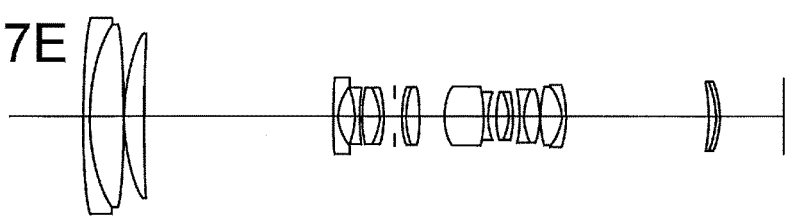

FIGS. 6A and 6B are graphs showing various aberrations of the variable magnification optical system according to the Second Example of the present application upon focusing on an infinite distance object, in a third intermediate focal length state, and in a telephoto end state, respectively.

As is apparent from the respective aberration graphs, the variable magnification optical system according to the present Example shows superb optical performance as a result of good corrections to various aberrations in the states from the wide-angle end state to the telephoto end state.

Third Example

FIGS. 7A, 7B, 7C, 7D and 7E are sectional views showing a variable magnification optical system according to a Third Example that is common to the first to the third embodiments of the present application, in a wide angle end state, in a first intermediate focal length state, in a second intermediate focal length state, in a third intermediate focal length state, and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power; and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a negative meniscus lens L24 having a concave surface facing the object side. Note that the negative meniscus lens L21 is a glass mold type aspherical lens having an object side lens surface formed into an aspherical shape.

The third lens group G3 consists of a cemented lens constructed by, in order from the object side, a negative meniscus lens L31 having a convex surface facing the object side cemented with a double convex positive lens L32. Note that an aperture stop S is provided on the object side of the third lens group G3.

The fourth lens group G4 consists of, in order from the object side, a cemented lens constructed by a double convex positive lens L41 cemented with a double concave negative lens L42, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Note that the negative meniscus lens L48 is a glass mold type aspherical lens having an image side lens surface formed into an aspherical shape.

The fifth lens group G5 consists of a cemented lens constructed by, in order from the object side, a positive meniscus lens L51 having a concave surface facing the object side cemented with a negative meniscus lens L52 having a concave surface facing the object side. Note that the negative meniscus lens L52 is a glass mold type aspherical lens having an image side lens surface formed into an aspherical shape.

In the variable magnification optical system according to the present Example, having the above described construction, upon zooming from the wide angle end state to the telephoto end state, the first lens group G1 to the fourth lens group G4 are moved toward the object side along the optical axis such that an air distance between the first lens group G1 and the second lens group G2, an air distance between the second lens group G2 and the third lens group G3, an air distance between the third lens group G3 and the fourth lens group G4, and an air distance between the fourth lens group G4 and the fifth lens group G5 are varied. The fifth lens group G5 is fixed for its position in the direction of an optical axis upon zooming. Incidentally, the aperture stop S is moved toward the object side integrally with the fourth lens group G4 upon zooming.

More specifically, upon zooming, the air distance between the first lens group G1 and the second lens group G2 is increased, the air distance between the second lens group G2 and the third lens group G3 is decreased, and the air distance between the fourth lens group G4 and the fifth lens group G5 is increased. The air distance between the third lens group G3 and the fourth lens group G4 is increased from the wide angle end state to the first intermediate focal length state, is decreased from the first intermediate focal length state to the second intermediate focal length state and is increased from the second intermediate focal length state to the telephoto end state. Also upon zooming, the air distance between the aperture stop S and the third lens group G3 is decreased from the wide angle end state to the first intermediate focal length state, is increased in a state from the first intermediate focal length state to the second intermediate focal length state and is decreased from the second intermediate focal length state to the telephoto end state.

Table 3 below shows various values of the variable magnification optical system according to the present Example.

TABLE 3

Third Example

[Surface Data]

| m | r | d | nd | vd |
|---|---|---|---|---|
| OP | ∞ | | | |
| 1 | 142.4935 | 1.6350 | 1.950000 | 29.37 |
| 2 | 42.2502 | 8.5971 | 1.497820 | 82.57 |
| 3 | −244.5599 | 0.1000 | | |
| 4 | 43.5280 | 4.7901 | 1.834810 | 42.73 |
| 5 | 290.5464 | d5 | | |
| *6 | 500.0000 | 1.0000 | 1.851350 | 40.10 |
| 7 | 9.0471 | 4.3168 | | |
| 8 | −20.3544 | 1.0000 | 1.903660 | 31.27 |
| 9 | 42.4575 | 0.7313 | | |
| 10 | 28.0881 | 4.0634 | 1.808090 | 22.74 |
| 11 | −12.5975 | 1.0000 | 1.883000 | 40.66 |
| 12 | −38.6924 | d12 | | |
| 13 | ∞ | d13 | | Aperture Stop S |
| 14 | 31.6163 | 1.0000 | 1.883000 | 40.66 |
| 15 | 15.7262 | 3.3464 | 1.593190 | 67.90 |
| 16 | −39.3012 | d16 | | |
| 17 | 13.5000 | 9.6782 | 1.717000 | 47.98 |
| 18 | −38.7323 | 1.0000 | 1.883000 | 40.66 |
| 19 | 11.8099 | 2.0000 | | |
| 20 | 19.9976 | 3.2554 | 1.516800 | 63.88 |
| 21 | −12.0110 | 1.0000 | 1.850260 | 32.35 |
| 22 | −20.9691 | 1.5000 | | |
| 23 | −39.8308 | 1.0000 | 1.950000 | 29.37 |
| 24 | 10.4776 | 3.5701 | 1.672700 | 32.19 |
| 25 | −30.1182 | 0.5349 | | |
| 26 | 36.6513 | 5.1773 | 1.581440 | 40.98 |
| 27 | −8.5118 | 1.0000 | 1.820800 | 42.71 |
| *28 | −28.2741 | d28 | | |
| 29 | −40.0000 | 1.9141 | 1.497820 | 82.57 |
| 30 | −18.1052 | 1.0000 | 1.834410 | 37.28 |
| *31 | −22.6207 | BF | | |
| I | ∞ | | | |

[Aspherical Data]

| m | 6 |
|---|---|
| κ | −3.81950 |
| A4 | 4.21558E−05 |
| A6 | −2.17082E−07 |
| A8 | −2.45102E−09 |
| A10 | 5.51411E−11 |
| A12 | −2.85950E−13 |
| m | 28 |
| κ | 1.0000 |
| A4 | −6.70317E−05 |
| A6 | −2.82990E−07 |
| A8 | 5.39592E−10 |
| A10 | −1.47007E−11 |
| A12 | 0.00000 |
| m | 31 |
| κ | 1.00000 |
| A4 | 2.67692E−05 |
| A6 | 2.52197E−08 |
| A8 | −6.04092E−10 |
| A10 | 0.00000 |
| A12 | 0.00000 |

[Various Data]
Variable magnification ratio 14.13

| | W | | T |
|---|---|---|---|
| f | 9.27 | ~ | 130.95 |
| FNO | 4.11 | ~ | 5.71 |
| ω | 42.66 | ~ | 3.37° |
| Y | 8.00 | ~ | 8.00 |
| TL | 113.35 | ~ | 167.85 |

| | W | M1 | M2 | M3 | T |
|---|---|---|---|---|---|
| f | 9.27001 | 17.98649 | 60.50024 | 89.50040 | 130.95047 |
| ω | 42.66459 | 22.98882 | 7.25983 | 4.93130 | 3.37079 |
| FNO | 4.11 | 5.12 | 5.73 | 5.75 | 5.71 |
| φ | 8.59 | 8.59 | 9.57 | 10.18 | 11.03 |
| d5 | 2.10000 | 14.22823 | 35.96983 | 41.57489 | 45.70436 |
| d12 | 24.57776 | 16.27840 | 5.38702 | 3.71762 | 2.20000 |
| d13 | 5.01075 | 3.17327 | 4.36075 | 3.46075 | 1.80000 |
| d16 | 2.25000 | 4.08748 | 2.90000 | 3.80000 | 5.46075 |
| d28 | 1.15583 | 11.01481 | 29.01229 | 32.10086 | 34.42483 |
| BF | 14.04945 | 14.04946 | 14.04979 | 14.04987 | 14.04999 |

[Lens Group Data]

| | ST | f |
|---|---|---|
| G1 | 1 | 67.49208 |
| G2 | 6 | −9.52181 |
| G3 | 14 | 41.09622 |
| G4 | 17 | 53.39457 |
| G5 | 29 | 147.67270 |

[Values for Conditional Expressions]

(1) $(-f2)/fw = 1.027$
(2) $f1/ft = 0.515$
(3), (6) $f1/(-f2) = 7.088$
(4) $(-f2)/ft = 0.073$
(5) $f1/fw = 7.281$

Figure 8A:
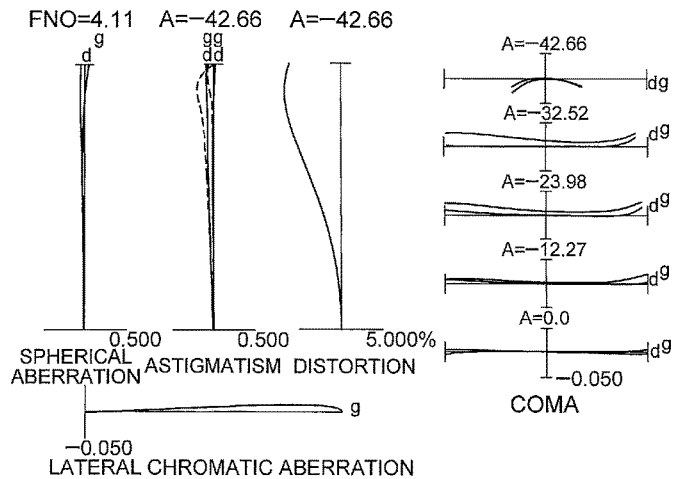
FIGS. 8A, 8B and 8C are graphs showing various aberrations of the variable magnification optical system according to the Third Example of the present application upon focusing on an infinite distance object, in the wide-angle end state, in the first intermediate focal length state, and in the second intermediate focal length state, respectively.
Figure 8B:
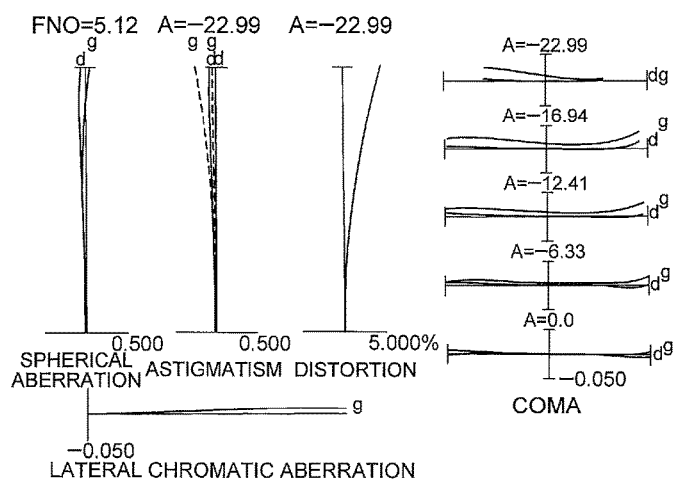
Figure 8C:
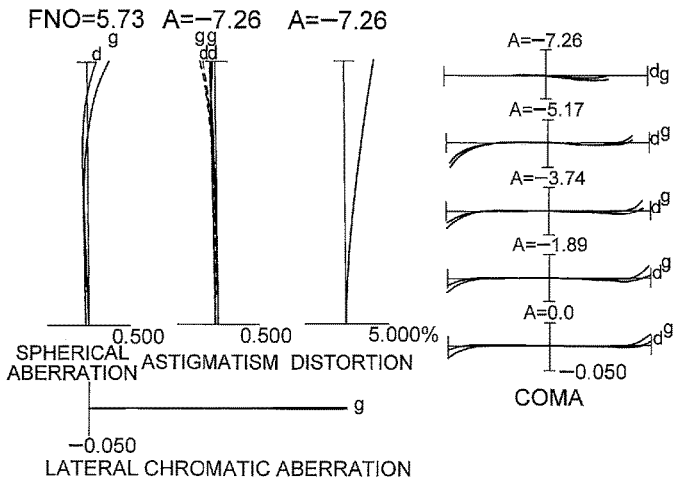

FIGS. 8A, 8B and 8C are graphs showing various aberrations of the variable magnification optical system according to the Third Example of the present application upon focusing on an infinite distance object, in a wide angle end state, in a first intermediate focal length state, and in a second intermediate focal length state, respectively.

Figure 9A:
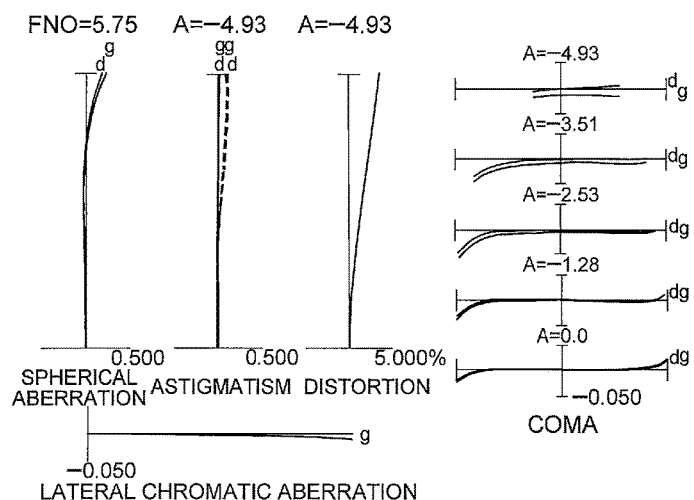
FIGS. 9A and 9B are graphs showing various aberrations of the variable magnification optical system according to the Third Example of the present application upon focusing on an infinite distance object, in the third intermediate focal length state, and in the telephoto end state, respectively.
Figure 9B:
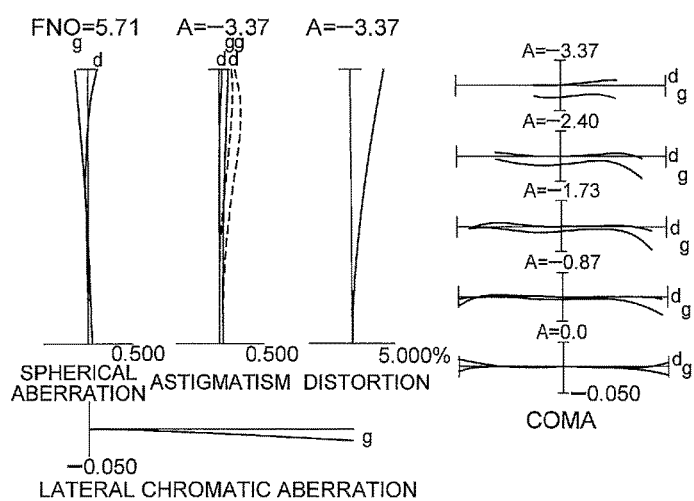
Figure 10A:
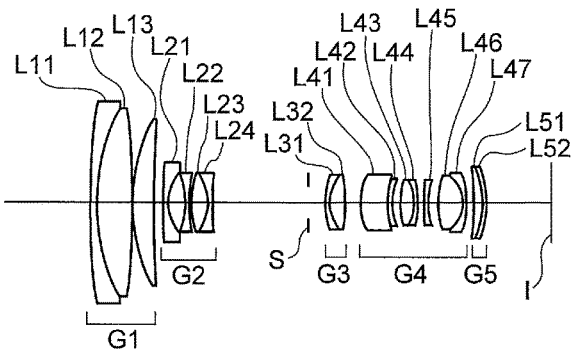
FIGS. 10A, 10B, 10C, 10D and 10E are sectional views showing a variable magnification optical system according to a Fourth Example that is common to the first to the third embodiments of the present application, in a wide-angle end state, in a first intermediate focal length state, in a second intermediate focal length state, in a third intermediate focal length state, and in a telephoto end state, respectively.
Figure 10B:
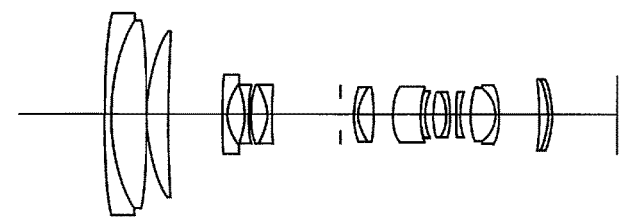
Figure 10C:
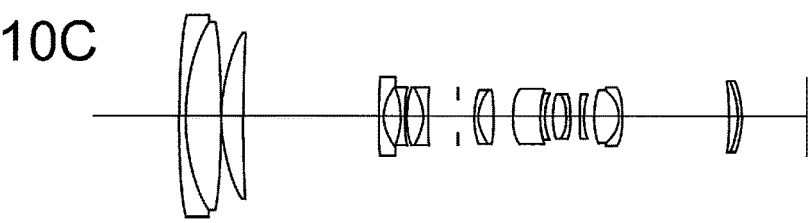
Figure 10D:
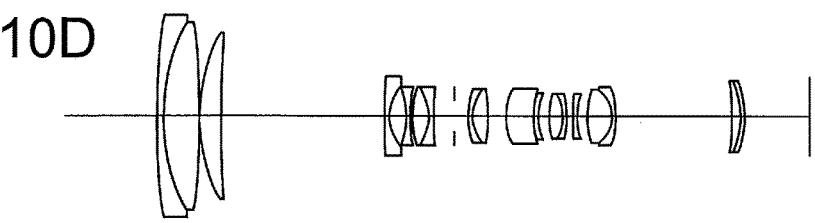
Figure 10E:
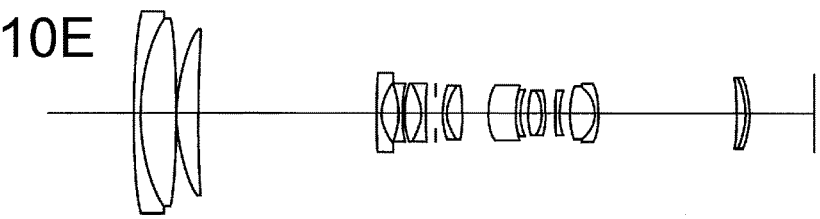

FIGS. 9A and 9B are graphs showing various aberrations of the variable magnification optical system according to the Third Example of the present application upon focusing on an infinite distance object, in a third intermediate focal length state, and in a telephoto end state, respectively.

As is apparent from the respective aberration graphs, the variable magnification optical system according to the present Example shows superb optical performance as a result of good corrections to various aberrations in the states from the wide-angle end state to the telephoto end state.

Fourth Example

FIGS. 10A, 10B, 10C, 10D and 10E are sectional views showing a variable magnification optical system according to a fourth Example that is common to the first to the third embodiments of the present application, in a wide angle end state, in a first intermediate focal length state, in a second intermediate focal length state, in a third intermediate focal length state, and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power; and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a double concave negative lens L24. Note that the negative meniscus lens L21 is a glass mold type aspherical lens having an object side lens surface formed into an aspherical shape.

The third lens group G3 consists of a cemented lens constructed by, in order from the object side, a negative meniscus lens L31 having a convex surface facing the object side cemented with a double convex positive lens L32. Note that an aperture stop S is provided on the object side of the third lens group G3.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a double concave negative lens L45, and a cemented lens constructed by a double convex positive lens L46 cemented with a negative meniscus lens L47 having a concave surface facing the object side. Note that the negative lens L45 is a glass mold type aspherical lens having an object side lens surface formed into an aspherical shape, and the negative meniscus lens L47 is a glass mold type aspherical lens having an image side lens surface formed into an aspherical shape.

The fifth lens group G5 consists of a cemented lens constructed by, in order from the object side, a positive meniscus lens L51 having a concave surface facing the object side cemented with a negative meniscus lens L52 having a concave surface facing the object side. Note that the negative meniscus lens L52 is a glass mold type aspherical lens having an image side lens surface formed into an aspherical shape.

In the variable magnification optical system according to the present Example, having the above described construction, upon zooming from the wide angle end state to the telephoto end state, the first lens group G1 to the fourth lens group G4 are moved along the optical axis such that an air distance between the first lens group G1 and the second lens group G2, an air distance between the second lens group G2 and the third lens group G3, an air distance between the third lens group G3 and the fourth lens group G4, and an air distance between the fourth lens group G4 and the fifth lens group G5 are varied.

More specifically, the first lens group G1, the third lens group G3 and the fourth lens group G4 are moved toward the object side upon zooming. The second lens group G2 is moved toward the object side from the wide angle end state to the second intermediate focal length state, is moved toward the image side from the second intermediate focal length state to the third intermediate focal length state, and is moved toward the object side in a state from the third intermediate focal length state to the telephoto end state. The fifth lens group G5 is fixed in its position in the direction of an optical axis upon zooming. Incidentally, the aperture stop S is moved toward the object side integrally with the fourth lens group G4 upon zooming.

Accordingly, upon zooming, the air distance between the first lens group G1 and the second lens group G2 is increased, the air distance between the second lens group G2 and the third lens group G3 is decreased, and the air distance between the fourth lens group G4 and the fifth lens group G5 is increased. The air distance between the third lens group G3 and the fourth lens group G4 is increases from the wide angle end state to the first intermediate focal length state, is decreased from the first intermediate focal length state to the second intermediate focal length state and is increased from the second intermediate focal length state to the telephoto end state. Also upon zooming, the air distance between the aperture stop S and the third lens group G3 is decreased from the wide angle end state to the first intermediate focal length state, is increased from the first intermediate focal length state to the second intermediate focal length state and is decreased from the second intermediate focal length state to the telephoto end state.

Table 4 below shows various values of the variable magnification optical system according to the present Example.

TABLE 4

Fourth Example

[Surface Data]

| m | r | d | nd | vd |
|---|---|---|---|---|
| OP | ∞ | | | |
| 1 | 128.2103 | 1.6350 | 1.950000 | 29.37 |
| 2 | 42.8046 | 8.6432 | 1.497820 | 82.57 |
| 3 | −200.0000 | 0.1000 | | |
| 4 | 42.6819 | 4.9663 | 1.816000 | 46.59 |
| 5 | 290.0414 | d5 | | |

TABLE 4-continued

Fourth Example

| | | | | |
|---|---|---|---|---|
| *6 | 500.0000 | 1.0000 | 1.851350 | 40.10 |
| 7 | 9.6706 | 3.8612 | | |
| 8 | −31.6340 | 1.0000 | 1.883000 | 40.66 |
| 9 | 50.5774 | 0.3860 | | |
| 10 | 20.2802 | 4.0969 | 1.808090 | 22.74 |
| 11 | −12.7389 | 1.0000 | 1.902650 | 35.73 |
| 12 | 182.6358 | d12 | | |
| 13 | ∞ | d13 | | Aperture Stop S |
| 14 | 22.0943 | 1.0000 | 1.883000 | 40.66 |
| 15 | 12.0211 | 3.4295 | 1.593190 | 67.90 |
| 16 | −54.4618 | d16 | | |
| 17 | 13.5315 | 7.0129 | 1.816000 | 46.59 |
| 18 | 20.2242 | 1.0000 | 1.850260 | 32.35 |
| 19 | 10.9126 | 2.0000 | | |
| 20 | 18.6799 | 3.1628 | 1.516800 | 63.88 |
| 21 | −12.1205 | 1.0000 | 1.850260 | 32.35 |
| 22 | −21.9214 | 1.5000 | | |
| *23 | −2373.2040 | 1.0000 | 1.806100 | 40.71 |
| 24 | 15.4976 | 2.3426 | | |
| 25 | 18.1342 | 5.9256 | 1.567320 | 42.58 |
| 26 | −8.0000 | 1.0000 | 1.851350 | 40.10 |
| *27 | −22.6238 | d27 | | |
| 28 | −75.6072 | 2.0606 | 1.497820 | 82.57 |
| 29 | −18.0744 | 1.0000 | 1.834410 | 37.28 |
| *30 | −25.8110 | BF | | |
| I | ∞ | | | |

[Aspherical Data]

| | |
|---|---|
| m | 6 |
| κ | −9.00000 |
| A4 | 1.14894E−05 |
| A6 | 2.79933E−07 |
| A8 | −1.11589E−08 |
| A10 | 1.42629E−10 |
| A12 | −6.44930E−13 |
| m | 23 |
| κ | 1.00000 |
| A4 | −3.10495E−05 |
| A6 | 4.64001E−07 |
| A8 | −2.52074E−09 |
| A10 | 1.73753E−10 |
| A12 | 0.00000 |
| m | 27 |
| κ | 1.0000 |
| A4 | −5.63578E−05 |
| A6 | −8.97938E−08 |
| A8 | 1.47935E−09 |
| A10 | −1.36135E−11 |
| A12 | 0.00000 |
| m | 30 |
| κ | 1.00000 |
| A4 | 2.81743E−05 |
| A6 | −2.96842E−08 |
| A8 | −7.80468E−10 |
| A10 | 0.00000 |
| A12 | 0.00000 |

[Various Data]
Variable magnification ratio 14.13

| | W | T |
|---|---|---|
| f | 10.30 | ~ 145.50 |
| FNO | 4.12 | ~ 5.77 |
| ω | 39.65 | ~ 3.02° |
| Y | 8.00 | 8.00 |
| TL | 107.35 | ~ 157.35 |

| | W | M1 | M2 | M3 | T |
|---|---|---|---|---|---|
| f | 10.30004 | 17.99586 | 60.49785 | 100.49280 | 145.50011 |
| ω | 39.65487 | 23.02121 | 7.21558 | 4.36760 | 3.01679 |
| FNO | 4.12 | 4.94 | 5.67 | 5.75 | 5.77 |
| φ | 8.34 | 8.34 | 9.08 | 9.22 | 10.26 |
| d5 | 2.10000 | 12.12447 | 32.02336 | 38.52508 | 41.21393 |
| d12 | 22.23850 | 16.63220 | 7.10168 | 3.99200 | 2.20000 |
| d13 | 3.91359 | 2.69844 | 3.58860 | 3.47054 | 1.80000 |
| d16 | 3.65694 | 4.87210 | 3.98194 | 4.10000 | 5.77054 |
| d27 | 1.26857 | 9.13237 | 25.54504 | 27.42933 | 32.19314 |
| BF | 14.04952 | 14.04918 | 14.04790 | 14.04914 | 14.04886 |

[Lens Group Data]

| | ST | f |
|---|---|---|
| G1 | 1 | 62.23195 |
| G2 | 6 | −9.03822 |
| G3 | 14 | 37.53030 |
| G4 | 17 | 49.24516 |
| G5 | 28 | 130.00164 |

[Values for Conditional Expressions]

| | |
|---|---|
| (1) | $(-f2)/fw = 0.877$ |
| (2) | $f1/ft = 0.428$ |
| (3), (6) | $f1/(-f2) = 6.885$ |
| (4) | $(-f2)/ft = 0.062$ |
| (5) | $f1/fw = 6.042$ |

Figure 11A:
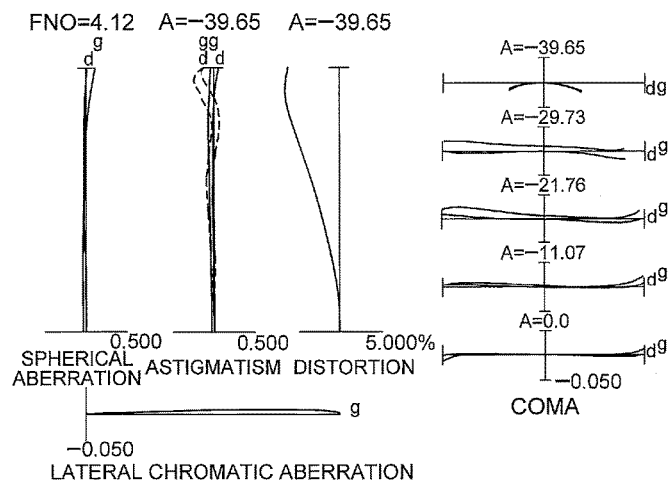
FIGS. 11A, 11B and 11C are graphs showing various aberrations of the variable magnification optical system according to the Fourth Example of the present application upon focusing on an infinite distance object, in the wide-angle end state, in the first intermediate focal length state, and in the second intermediate focal length state, respectively.
Figure 11B:
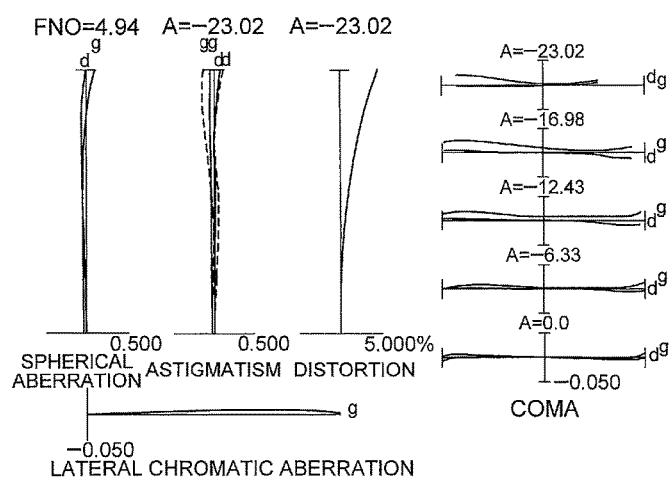
Figure 11C:
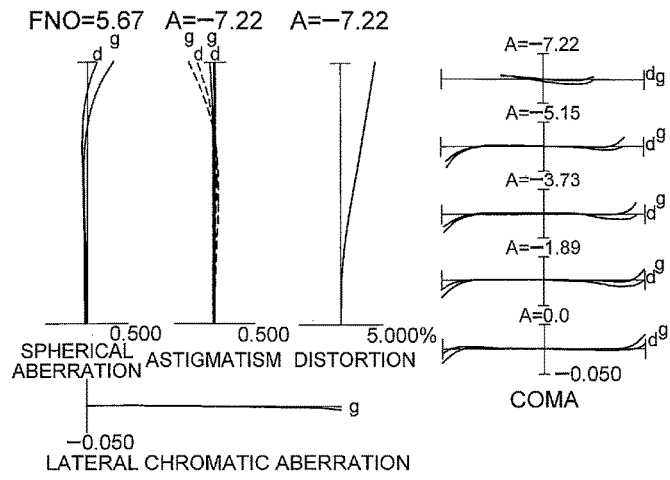

FIGS. 11A, 11B and 11C are graphs showing various aberrations of the variable magnification optical system according to the Fourth Example of the present application upon focusing on an infinite distance object, in a wide angle end state, in a first intermediate focal length state, and in a second intermediate focal length state, respectively.

Figure 12A:
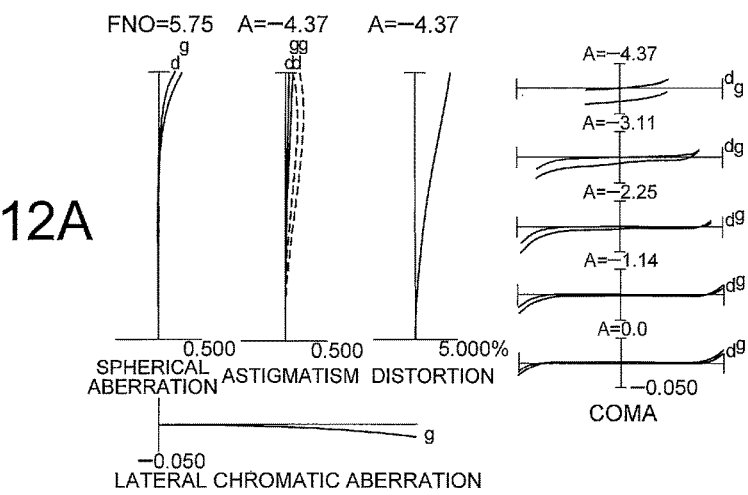
FIGS. 12A and 12B are graphs showing various aberrations of the variable magnification optical system according to the Fourth Example of the present application upon focusing on an infinite distance object, in the third intermediate focal length state, and in the telephoto end state, respectively.
Figure 12B:
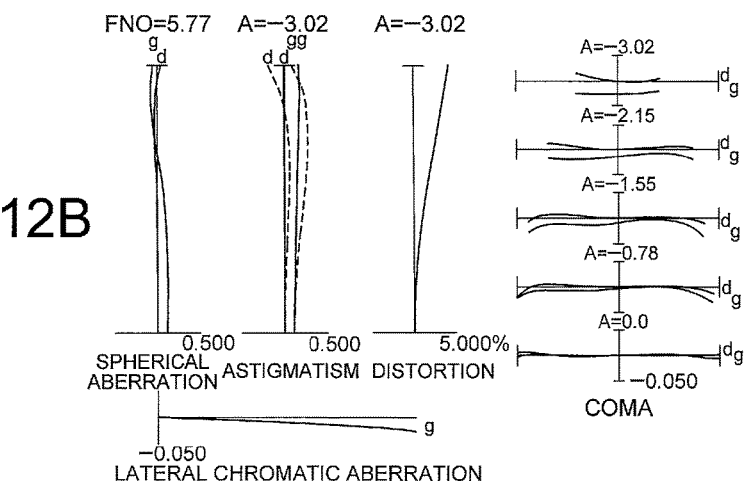

FIGS. 12A and 12B are graphs showing various aberrations of the variable magnification optical system according to the Fourth Example of the present application upon focusing on an infinite distance object, in a third intermediate focal length state, and in a telephoto end state, respectively.

As is apparent from the respective aberration graphs, the variable magnification optical system according to the present Example shows superb optical performance as a result of good corrections to various aberrations from the wide-angle end state to the telephoto end state.

According to the Examples, it is possible to realize a variable magnification optical system that has a high variable magnification ratio, is compact in size and exhibits high optical performance.

Note that each of the above described Examples is a concrete example of the invention of the present application, and the invention of the present application is not limited to them. The contents described below can be adopted without deteriorating optical performance of the variable magnification optical systems according to the first to the third Embodiments of the present application.

Although the variable magnification optical systems each having a five-lens-group configuration were illustrated above as numerical examples of the variable magnification optical systems according to the first to the third Embodiments of the present application, the present application is not limited to them and variable magnification optical systems having other configurations (such as six-lens-group configuration, seven-lens-group configuration, and the like) can be constructed. Concretely, a lens configuration in which a lens or a lens group is added to the most object side of the variable magnification optical systems according to the first to the third Embodiments of the present application is possible, and another lens configuration in which a lens or a lens group is added to the most image side thereof is also possible. Incidentally, a lens group is defined as a portion including at least one lens separated by air spaces.

Further, in the variable magnification optical systems according to the first to the third Embodiments of the present application, in order to vary focusing from an infinitely distance object to a close object, a portion of a lens group, a single lens group in the entirety thereof, or a plurality of lens groups may be configured to move along the optical axis as a focusing lens group. It is particularly preferable that at least a portion of the second lens group, at least a portion of the third lens group, or at least a portion of the fourth lens group, or at least a portion of the fifth lens group is used as the focusing lens group. The focusing lens group can be used for auto focus, and is suitable for being driven by a motor for auto focus, such as an ultrasonic motor.

Further, in the variable magnification optical systems according to the first to the third Embodiments of the present application, any lens group in the entirety thereof or a portion thereof can be shifted in a direction including a component perpendicular to the optical axis as a vibration reduction lens group, or rotationally moved in an intra-plane direction including the optical axis, that is, swayed for correcting an image blur caused by a camera shake. Particularly, in the variable magnification optical systems according to the first to the third Embodiments of the present application, it is preferable that at least a portion of the third lens group, or at least a portion of the fourth lens group, or at least a portion of the fifth lens group is used as a vibration reduction lens group.

Further, in the variable magnification optical systems according to the first to the third Embodiments of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if the image plane is shifted, deterioration in optical performance is little, so that it is preferable. When a lens surface is an aspherical surface, the aspherical surface may be fabricated by a grinding process, a glass molding process in which a glass material is formed into an aspherical shape by a mold, or a compound type process in which a resin material provided on a glass lens surface is formed into an aspherical shape. A lens surface may be a diffractive optical surface, and a lens may be a graded-index type lens (GRIN lens) or a plastic lens.

Further, in the variable magnification optical systems according to the first to the third Embodiments of the present application, it is preferable that the aperture stop is disposed in the third lens group or in the vicinity of the third lens group, and the function may be substituted by a lens frame without disposing a member as the aperture stop.

Moreover, the lens surface of the lenses configuring the variable magnification optical systems according to the first to the third Embodiments of the present application may be coated with an anti-reflection coating having a high transmittance in a broad wavelength range. With this contrivance, it is feasible to reduce a flare as well as ghost and attain high contrast and high optical performance.

Next, a camera equipped with a variable magnification optical system according to the first to the third Embodiment of the present application will be explained with referring to FIG. 13.

Figure 13:
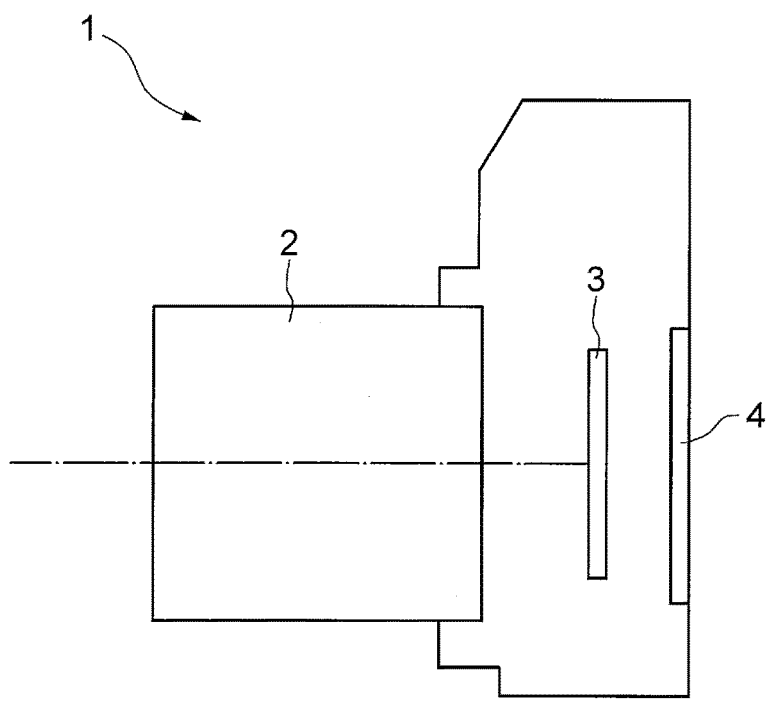
FIG. 13 is a view showing a configuration of a camera equipped with a variable magnification optical system according to the first embodiment to the third embodiment of the present application.

FIG. 13 is a view showing a configuration of a camera equipped with a variable magnification optical system according to the first to the third Embodiment of the present application.

The present camera 1 shown in FIG. 13 is a so-called mirrorless camera of interchangeable lens type equipped with the variable magnification optical system according to the first Example as an imaging lens 2.

In the present camera 1, light emitted from an unillustrated object as a subject is collected by the imaging lens 2, so that a subject image is formed on an imaging surface of an imaging part 3 through an unillustrated OLPF (optical low pass filter). The subject image then undergoes photoelectric conversion with a photoelectric conversion device in the imaging part 3 to generate an image of the subject. The image is displayed on an EVF 4 (electronic view finder) mounted on the camera 1. Accordingly, a photographer can observe the subject through the EVF 4.

Moreover, when the photographer presses an unillustrated release button down, the subject image generated in the imaging part 3 is stored in an unillustrated memory. In this manner, the photographer can take a picture of a subject by the camera 1.

Here, the variable magnification optical system according to the first Example installed as the imaging lens 2 in the camera 1 is a variable magnification optical system that has a high variable magnification ratio, is compact in size, and has high optical performance. Accordingly, the present camera 1 can realize downsizing and high optical performance while achieving a high variable magnification ratio. Incidentally, even if a variable magnification optical system according to the second to the fourth example is installed as an imaging lens 2 in the camera, the same effect as the camera 1 can be obtained. Further, even if a variable magnification optical system according to each of the above described Examples is installed in a single-lens reflex camera, which includes a quick return mirror and is capable of observing a subject through a finder optical system, the same effect as the camera 1 can be achieved.

Figure 14:
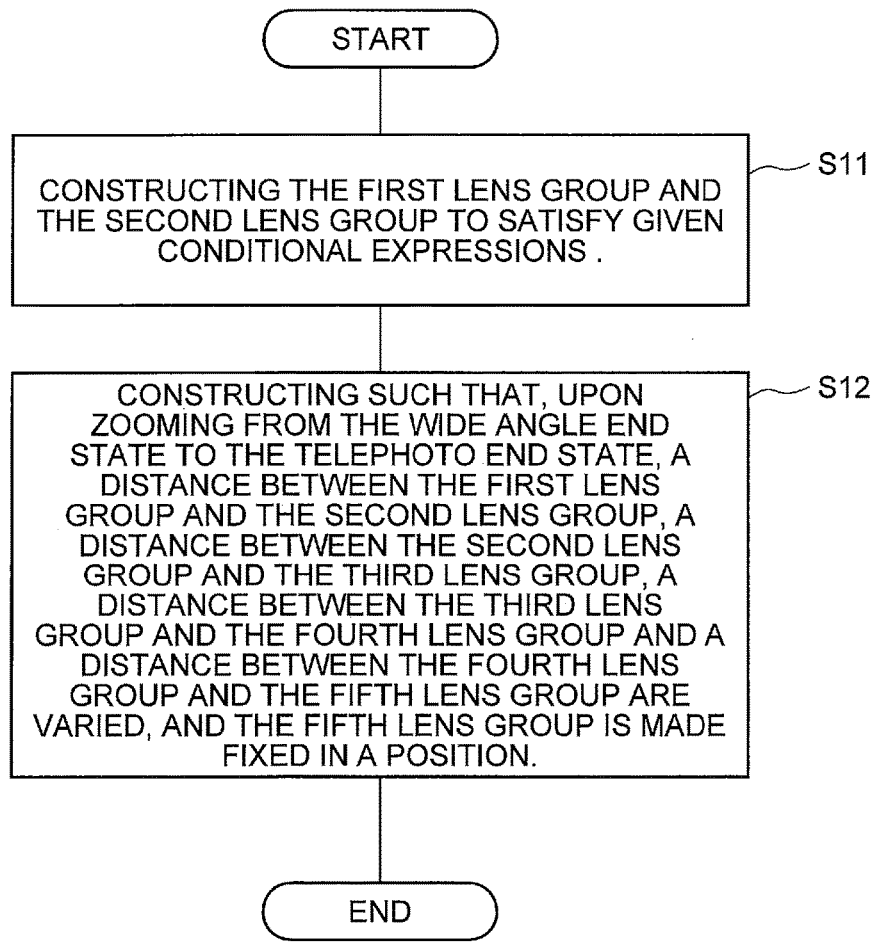
FIG. 14 is a flowchart schematically showing a method for manufacturing the variable magnification optical system according to the first embodiment of the present application.
Figure 15:
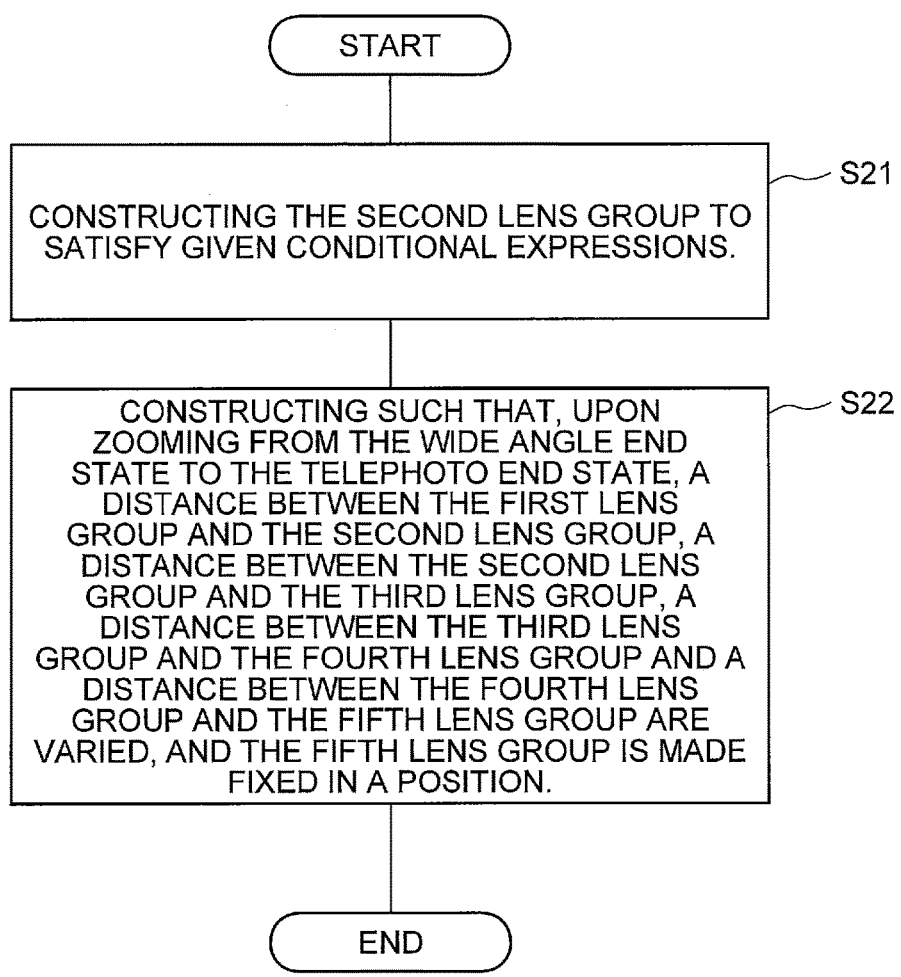
FIG. 15 is a flowchart schematically showing a method for manufacturing the variable magnification optical system according to the second embodiment of the present application.
Figure 16:
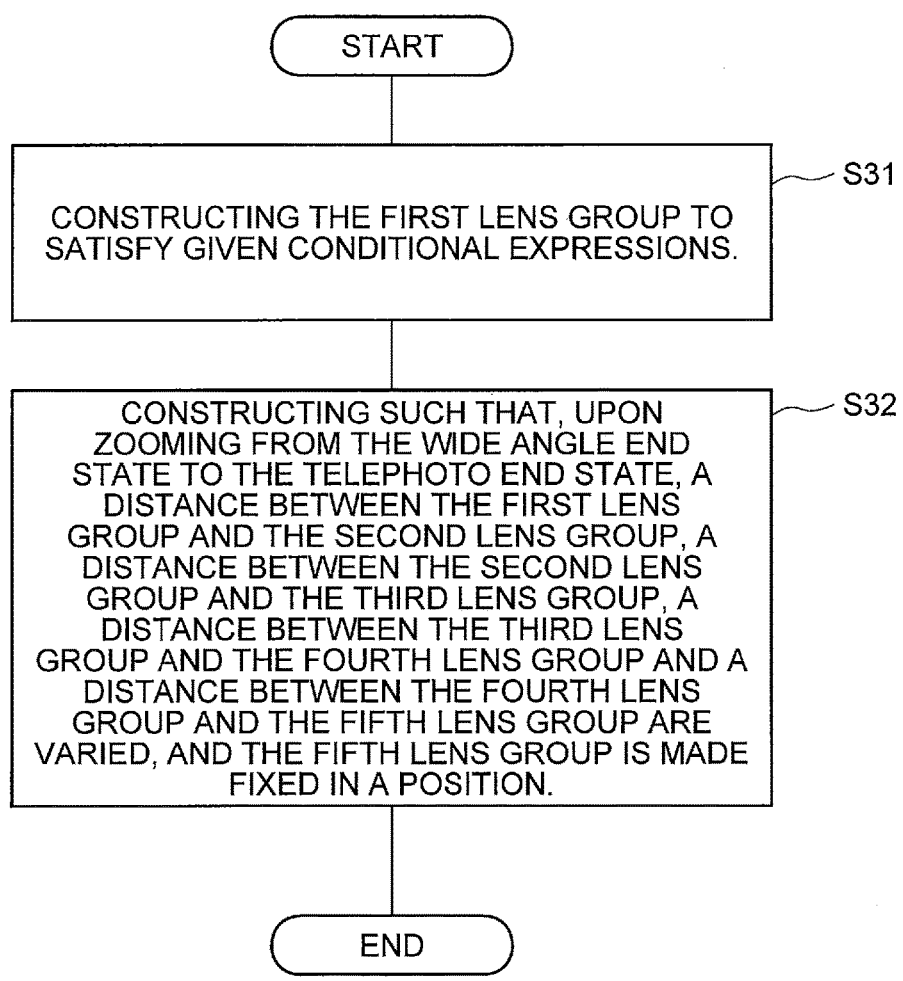
FIG. 16 is a flowchart schematically showing a method for manufacturing the variable magnification optical system according to the third embodiment of the present application.

Finally, an outline of methods for manufacturing variable magnification optical systems according to the first to the third Embodiments of the present application is described with referring to FIGS. 14 to 16.

The method for manufacturing the variable magnification optical system according to the first embodiment of the present application shown in FIG. 14 is a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group, and the method comprises the following steps of S11 and S12:

Step S11: Constructing the first lens group and the second lens group to satisfy the following conditional expressions (1) and (2), and disposing the lens groups in a lens barrel in order from an object side:

$$0.650 < (-f2)/fw < 1.180 \quad (1)$$

$$0.300 < f1/ft < 0.555 \quad (2)$$

where fw denotes a focal length of the variable magnification optical system in a wide-angle end state, ft denotes a focal length of the variable magnification optical system in a telephoto end state, f1 denotes a focal length of the first lens group, and f2 denotes a focal length of the second lens group.

Step S12: Constructing, for example by providing a known movement mechanism in a lens barrel, such that, upon zooming from the wide angle end state to the telephoto end state, a distance between the first lens group and the second lens group, a distance between the second lens group and the third lens group, and a distance between the third lens group and the fourth lens group, and a distance between the fourth lens group and the fifth lens group are varied. At that time, the fifth lens group is made fixed for its position.

According to the method for manufacturing the variable magnification optical system according to the first embodiment of the present application, it is possible to manufacture a variable magnification optical system that has a high variable magnification ratio, is compact in size and exhibits high optical performance.

The method for manufacturing the variable magnification optical system according to the second embodiment of the present application shown in FIG. 15 is a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group, and the method comprises the following steps of S21 and S22:

Step S21: Constructing the second lens group to satisfy the following conditional expressions (1) and (4), and disposing the lens groups in a lens barrel in order from an object side:

$$0.650 < (-f2)/fw < 1.180 \quad (1)$$

$$0.040 < (-f2)/ft < 0.092 \quad (4)$$

where fw denotes a focal length of the variable magnification optical system in a wide-angle end state, ft denotes a focal length of the variable magnification optical system in a telephoto end state, and f2 denotes a focal length of the second lens group.

Step S22: Constructing, for example by providing a known movement mechanism in a lens barrel, such that, upon zooming from the wide angle end state to the telephoto end state, a distance between the first lens group and the second lens group, a distance between the second lens group and the third lens group, and a distance between the third lens group and the fourth lens group, and a distance between the fourth lens group and the fifth lens group are varied. At that time, the fifth lens group is made fixed for its position.

According to the method for manufacturing the variable magnification optical system according to the second embodiment of the present application, it is possible to manufacture a variable magnification optical system that has a high variable magnification ratio, is compact in size and exhibits high optical performance.

The method for manufacturing the variable magnification optical system according to the third embodiment of the present application shown in FIG. 16 is a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group, and the method comprises the following steps of S31 and S32:

Step S31: Constructing the first lens group to satisfy the following conditional expressions (5) and (2), and disposing the lens groups in a lens barrel in order from an object side:

$$5.000 < f1/fw < 7.800 \quad (5)$$

$$0.300 < f1/ft < 0.555 \quad (2)$$

where fw denotes a focal length of the variable magnification optical system in a wide-angle end state, ft denotes a focal length of the variable magnification optical system in a telephoto end state, and f1 denotes a focal length of the first lens group.

Step S32: Constructing, for example by providing a known movement mechanism in a lens barrel, such that, upon zooming from the wide angle end state to the telephoto end state, a distance between the first lens group and the second lens group, a distance between the second lens group and the third lens group, and a distance between the third lens group and the fourth lens group, and a distance between the fourth lens group and the fifth lens group are varied. At that time, the fifth lens group is made fixed for its position.

According to the method for manufacturing the variable magnification optical system according to the third embodiment of the present application, it is possible to manufacture a variable magnification optical system that has a high variable magnification ratio, is compact in size and exhibits high optical performance.

What is claimed is:

1. A variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and the first lens group being moved toward the object side; and the following conditional expressions being satisfied:

$$0.650 < |-f2|/fw < 1.180 \quad (1)$$

$$0.300 < f1/ft < 0.530 \quad (2A)$$

$$6.750 < f1/|-f2| < 8.500 \quad (3A)$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group.

2. The variable magnification optical system according to claim 1, wherein upon zooming from the wide-angle end state to the telephoto end state, the third lens group is moved toward the object side.

3. The variable magnification optical system according to claim 1, wherein the fifth lens group has positive refractive power.

4. The variable magnification optical system according to claim 1, wherein upon zooming from the wide-angle end state to the telephoto end state, the distance between the first lens group and the second lens group is increased.

5. The variable magnification optical system according to claim 1, wherein upon zooming from the wide-angle end state to the telephoto end state, the distance between the second lens group and the third lens group is decreased.

6. The variable magnification optical system according to claim 1, wherein upon zooming from the wide-angle end state to the telephoto end state, the distance between the fourth lens group and the fifth lens group is increased.

7. The variable magnification optical system according to claim 1, wherein the following conditional expression is satisfied:

$$0.040<|-f2|/ft<0.092 \quad (4)$$

where ft denotes the focal length of the variable magnification optical system in the telephoto end state, and f2 denotes the focal length of the second lens group.

8. The variable magnification optical system according to claim 1, wherein the following conditional expression is satisfied:

$$5.000<f1/fw<7.800 \quad (5),$$

where fw denotes a focal length of the variable magnification optical system in the wide angle end state, and f1 denotes the focal length of the first lens group.

9. An optical apparatus equipped with the variable magnification optical system according to claim 1.

10. A variable magnification optical system comprising, in order from an object side: a first lens group having positive refractive power; a second lens group having negative refractive power; a third lens group having positive refractive power; a fourth lens group having positive refractive power; and a fifth lens group;
   upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and
   the following conditional expressions being satisfied:

$$0.650<|-f2|/fw<1.180 \quad (1)$$

$$0.040<|-f2|/ft<0.084 \quad (4A)$$

$$6.750<f1/|-f2|<8.500 \quad (3A)$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group.

11. The variable magnification optical system according to claim 10, wherein the following conditional expression is satisfied:

$$5.300<f1/|-f2|<7.430 \quad (6)$$

where f1 denotes a focal length of the first lens group, and f2 denotes the focal length of the second lens group.

12. The variable magnification optical system according to claim 10, wherein the following conditional expression is satisfied:

$$5.000<f1/fw<7.800 \quad (5)$$

where fw denotes the focal length of the variable magnification optical system in the wide-angle end state, and f1 denotes a focal length of the first lens group.

13. An optical apparatus equipped with the variable magnification optical system according to claim 10.

14. A variable magnification optical system comprising, in order from an object side: a first lens group having positive refractive power; a second lens group having negative refractive power; a third lens group having positive refractive power; a fourth lens group having positive refractive power; and a fifth lens group;
   upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and
   the following conditional expressions being satisfied:

$$5.000<f1/fw<7.800 \quad (5)$$

$$0.300<f1/ft\leq0.515 \quad (2B)$$

where fw denotes a focal length of the variable magnification optical system in the wide-angle end state, ft denotes a focal length of the variable magnification optical system in the telephoto end state, and f1 denotes a focal length of the first lens group.

15. The variable magnification optical system according to claim 14, wherein the following conditional expression is satisfied:

$$5.300<f1/|-f2|<7.430 \quad (6)$$

where f1 denotes the focal length of the first lens group, and f2 denotes a focal length of the second lens group.

16. The variable magnification optical system according to claim 14, wherein the following conditional expression is satisfied:

$$0.040<|-f2|/ft<0.092 \quad (4)$$

where ft denotes the focal length of the variable magnification optical system in the telephoto end state, and f2 denotes a focal length of the second lens group.

17. An optical apparatus equipped with the variable magnification optical system according to claim 14.

18. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising:
   constructing the first lens group and the second lens group to satisfy the following conditional expressions:

$$0.650<|-f2|)/fw<1.180 \quad (1)$$

$$0.300<f1/ft<0.530 \quad (2A)$$

$$6.750<f1/|-f2|<8.500 \quad (3A)$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group; and
   constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, the fifth lens group is fixed in a position, and the first lens group is moved toward the object side.

19. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising:

constructing the second lens group to satisfy the following conditional expressions:

$$0.650 < |-f2|/fw < 1.180 \tag{1}$$

$$0.040 < |-f2|/ft < 0.084 \tag{4A}$$

$$6.750 < f1/|-f2| < 8.500 \tag{3A}$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position.

20. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising:

constructing the first lens group to satisfy the following conditional expressions:

$$5.000 < f1/fw < 7.800 \tag{5}$$

$$0.300 < f1/ft \le 0.515 \tag{2B}$$

where fw denotes a focal length of the variable magnification optical system in the wide-angle end state, ft denotes a focal length of the variable magnification optical system in the telephoto end state, and f1 denotes a focal length of the first lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position.

21. A variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and the first lens group being moved toward the object side; and the following conditional expressions being satisfied:

$$0.650 < |-f2|/fw < 1.180 \tag{1}$$

$$0.300 < f1/ft \le 0.515 \tag{2B}$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group.

22. A variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and the following conditional expressions being satisfied:

$$0.760 < |-f2|/fw < 1.180 \tag{1A}$$

$$0.040 < |-f2|/ft \le 0.075 \tag{4B}$$

where fw denotes a focal length of the variable magnification optical system in the wide-angle end state, ft denotes a focal length of the variable magnification optical system in the telephoto end state, and f2 denotes a focal length of the second lens group.

23. A variable magnification optical system comprising, in order from an object side: a first lens group having positive refractive power; a second lens group having negative refractive power; a third lens group having positive refractive power; a fourth lens group having positive refractive power; and a fifth lens group;

upon zooming from a wide-angle end state to a telephoto end state, a distance between the first lens group and the second lens group, a distance between the second lens group and the third lens group, a distance between the third lens group and the fourth lens group, and a distance between the fourth lens group and the fifth lens group being varied; and the fifth lens group being fixed in a position; and the following conditional expressions being satisfied:

$$5.000 < f1/fw < 7.800 \tag{5}$$

$$0.300 < f1/ft < 0.530 \tag{2A}$$

$$6.750 < f1/|-f2| < 8.500 \tag{3A}$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group.

24. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising:

constructing the first lens group and the second lens group to satisfy the following conditional expressions:

$$0.650 < |-f2|/fw < 1.180 \tag{1}$$

$$0.300 < f1/ft \leq 0.515 \tag{2B}$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, the fifth lens group is fixed in a position, and the first lens group is moved toward the object side.

25. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising:

constructing the second lens group to satisfy the following conditional expressions:

$$0.760 < |-f2|/fw < 1.180 \tag{1A}$$

$$0.040 < |-f2|/ft \leq 0.075 \tag{4B}$$

where fw denotes a focal length of the variable magnification optical system in the wide-angle end state, ft denotes a focal length of the variable magnification optical system in the telephoto end state, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position.

26. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group; the method comprising:

constructing the first lens group to satisfy the following conditional expressions:

$$5.000 < f1/fw < 7.800 \tag{5}$$

$$0.300 < f1/ft < 0.530 \tag{2A}$$

$$6.750 < f1/|-f2| < 8.500 \tag{3A}$$

where fw denotes a focal length of the variable magnification optical system in the wide-angle end state, ft denotes a focal length of the variable magnification optical system in the telephoto end state, f1 denotes a focal length of the first lens group, and f2 denotes a focal length of the second lens group; and constructing such that, upon zooming from the wide-angle end state to the telephoto end state, a distance between the first lens group and the second lens group, a distance between the second lens group and the third lens group, a distance between the third lens group and the fourth lens group, and a distance between the fourth lens group and the fifth lens group are varied, and the fifth lens group is fixed in a position.

* * * * *